United States Patent [19]

Nakane et al.

[11] Patent Number: 5,629,754
[45] Date of Patent: May 13, 1997

[54] PHOTOGRAPHIC PRINTING APPARATUS AND A ROLL MAGAZINE HOLDER THEREFOR

[75] Inventors: Nobu Nakane; Mitsuru Katagiri, both of Hino, Japan

[73] Assignee: Konica Corporation, Tokyo, Japan

[21] Appl. No.: 576,568

[22] Filed: Dec. 21, 1995

[30] Foreign Application Priority Data

Dec. 26, 1994 [JP] Japan .................................. 6-323061

[51] Int. Cl.$^6$ .................................................. G03B 27/58
[52] U.S. Cl. .................................................. 355/72; 355/73
[58] Field of Search ..................................... 355/72, 73, 309, 355/311; 101/232; 271/162

[56] References Cited

U.S. PATENT DOCUMENTS

| | | | |
|---|---|---|---|
| 4,147,427 | 4/1979 | Stewart | 355/72 |
| 4,636,064 | 1/1987 | Penza et al. | 355/72 |
| 5,021,824 | 6/1991 | Higashi et al. | 355/72 |
| 5,044,620 | 9/1991 | Ruch et al. | 355/309 X |
| 5,187,531 | 2/1993 | Ozawa et al. | 355/72 X |
| 5,216,471 | 6/1993 | Kajita et al. | 355/311 |
| 5,335,045 | 8/1994 | Kunz et al. | 355/72 |
| 5,438,388 | 8/1995 | Arimoto et al. | 355/72 X |

*Primary Examiner*—Arthur T. Grimley
*Assistant Examiner*—David A. Lane
*Attorney, Agent, or Firm*—Finnegan, Henderson, Farabow, Garrett & Dunner, L.L.P.

[57] ABSTRACT

A photographic printing apparatus includes a first and second magazines for storing a roll-shaped photographic light-sensitive material therein respectively, a first and second draw-out members each for drawing out the material from the first or second magazine at a first or second draw-out position, a first and second cutters for cutting the materials drawn out from the first and second draw-out members respectively, an accepting device for accepting and holding the materials drawn out from the first draw-out member at an exposure position, and a driving device for driving the accepting device from the first draw-out position to the second draw-out position. The driving device drives the accepting device which has held the material drawn out by the second draw-out member at the second draw-out position, from the second draw-out position to the first draw-out position so as to hold the material at the exposure position.

8 Claims, 22 Drawing Sheets

PHOTOGRAPHIC PRINTING APPARATUS AND A ROLL MAGAZINE HOLDER THEREFOR

BACKGROUND OF THE INVENTION

The present invention relates to a photographic printing apparatus and a roll magazine holder therefor.

There has been known a photographic printing apparatus provided with a plurality of roll magazines from which a photographic light-sensitive material for printing such as a photographic paper is fed out. Examples thereof are disclosed in Japanese Utility model Open to Public Inspection Nos. 78052/1982 and 58226/1988, and in Japanese Patent Publication Open to Public Inspection No. 51133/1992.

However, the conventional photographic printing apparatus wherein a photographic light-sensitive material for printing is supplied from each of plural roll magazines in the apparatus is provided with means for feeding out the photographic light-sensitive material for printing corresponding in terms of quantity to the plural roll magazines, and a large number of members have been required for the apparatus.

Further, in the conventional photographic printing apparatus wherein a photographic light-sensitive material for printing is supplied from each of plural roll magazines in the apparatus, each of the roll magazines is provided with a feed-out means for photographic light-sensitive materials for printing, and the photographic light-sensitive materials coming from all feed-out means are guided to a common transport path in its structure. Therefore, there has been a restriction in placement of roll magazines, including that roll axes need to be in parallel each other and each center of a roll axis in the direction of a roll width needs to be in the same plane that is perpendicular to the roll axis. Accordingly, when photographic light-sensitive materials are supplied from many roll magazines, for example, an apparatus had to be on a large scale.

On a photographic printing apparatus wherein photographic light-sensitive materials for printing are supplied from a conventional roll magazine, there has been a problem that a photographic light-sensitive material drawn out of the roll magazine is fogged when switching roll magazines.

Further, in a conventional photographic printing apparatus, when printing on a photographic light-sensitive material for printing positioned vertically or horizontally, a photographic original has been changed to be positioned vertically or horizontally, sacrificing that the photographic original may be scratched. Or, when printing on a photographic light-sensitive material for printing in the same size positioned vertically or horizontally, a roll magazine having a width representing a longitudinal dimension of the print size and that having a width representing a lateral dimension thereof are set separately for supplying the photographic light-sensitive materials for printing separately.

In addition, in a roll magazine holder which supplies photographic light-sensitive materials for printing from a plurality of conventional roll magazines, each of plural roll magazines to be held by the roll magazine holder is provided with a feed-out means for photographic light-sensitive materials for printing, and a large number of members are required accordingly.

SUMMARY OF THE INVENTION

The first object of the invention is to provide a photographic printing apparatus having less members and supplying photographic light-sensitive materials for printing from a plurality of roll magazines.

The second object of the invention is to eliminate the restriction for placement of roll magazines mentioned above.

The third object of the invention is to make it possible to switch roll magazines without a problem that photographic light-sensitive materials for printing drawn out of the roll magazines are fogged.

The fourth object of the invention is to achieve that a photographic original does not need to be positioned vertically or horizontally, and even when printing on photographic light-sensitive materials for printing in the same size, printing can be performed on the photographic light-sensitive material for printing positioned vertically or on that positioned horizontally without setting roll magazines separately.

The fifth object of the invention is to provide a roll magazine holder capable having less members and supplying photographic light-sensitive materials for printing from a plurality of roll magazines.

Problems awaiting solution in the invention can be solved by the following constitution.

The first embodiment attaining the first object of the invention is represented by a photographic printing apparatus capable of being set with a first roll magazine and a second roll magazine each being a magazine for roll-shaped photographic light-sensitive materials for printing, wherein, when a position of a roll magazine at the moment when a photographic light-sensitive material for printing to be fed into a main body of the photographic printing apparatus is called a draw-out position, a feed-out means which draws out a photographic light-sensitive material for printing from a roll magazine positioned at the aforesaid draw-out position and feeds it into the main body of the photographic printing apparatus, a first roll magazine transport means that transports the aforesaid first roll magazine between the aforesaid draw-out position and the first standby position that is away from the aforesaid draw-out position, and a second roll magazine transport means that transports the aforesaid second roll magazine between the aforesaid draw-out position and the second standby position that is away from the aforesaid draw-out position are provided, and the aforesaid first standby position is away from the second standby position. Under the constitution mentioned above, when a photographic light-sensitive material for printing is drawn out of the first roll magazine by the aforesaid feed-out means, the first roll magazine is set at the draw-out position and the second roll magazine is set at the second standby position which is away from the aforesaid draw-out position. Further, when a photographic light-sensitive material for printing is drawn out of the second roll magazine by the aforesaid feed-out means, the second roll magazine is set at the draw-out position and the first roll magazine is set at the first standby position which is away from the aforesaid draw-out position. Therefore, the first roll magazine does not interfere with the second roll magazine. Further, a draw-out position for a photographic light-sensitive material for printing to be dram out of the first roll magazine by a feed-out means is the same as that for a photographic light-sensitive material for printing to be dram out of the second roll magazine by a feed-out means, and a photographic light-sensitive material for printing in the first roll magazine and that in the second roll magazine are drawn out by the same and common feed-out means. Therefore, photographic light-sensitive materials for printing can be supplied from a plurality of roll magazines despite less number of members in the feed-out means.

Incidentally, the first standby position which is away from the draw-out position means that a space occupied by a roll magazine positioned at the draw-out position is not overlapped on or is not brought into contact with a space occupied by a roll magazine positioned at the first standby position and that the first standby position is away from the draw-out position. In the same way, the second standby position which is away from the draw-out position means that a space occupied by a roll magazine positioned at the draw-out position is not overlapped on or is not brought into contact with a space occupied by a roll magazine positioned at the second standby position and that the second standby position is away from the draw-out position. The first standby position which is away from the second standby position means that a space occupied by a roll magazine positioned at the first standby position is not overlapped on or is not brought into contact with a space occupied by a roll magazine positioned at the second standby position and that the first standby position is away from the second standby position.

The second embodiment of the invention is represented by a photographic printing apparatus in the first embodiment wherein when setting the first roll magazine at the draw-out position, the second roll magazine is transported to the second standby position by the second roll magazine transport means, and after setting the second roll magazine at the second standby position, the first roll magazine is transported to the draw-out position by the first roll magazine transport means, while when setting the second roll magazine at the draw-out position, the first roll magazine is transported to the first standby position by the first roll magazine transport means, and after setting the first roll magazine at the first standby position, the second roll magazine is transported to the draw-out position by the second roll magazine transport means.

Under the constitution mentioned above, when setting the first roll magazine at the draw-out position, the second roll magazine is set at the second standby position and then the first roll magazine is set at the draw-out position. Therefore, the first roll magazine does not interfere with the second roll magazine. Similarly, when setting the second roll magazine at the draw-out position, the first roll magazine is set at the first standby position and then the second roll magazine is set at the draw-out position. Therefore, the second roll magazine does not interfere with the first roll magazine. Therefore, a photographic light-sensitive material for printing in the first roll magazine and that in the second roll magazine can be dram out by the common feed-out means without interference between the first roll magazine and the second roll magazine, which makes it possible to switch automatically the roll magazines capable of supplying photographic light-sensitive materials for printing from a plurality of roll magazines with less number of constituent members in the feed-out means.

In this case, it is preferable "to have a control means which controls the second roll magazine transport means to set the second roll magazine at the second standby position when setting the first roll magazine at the draw-out position and controls the first roll magazine transport means to set the first roll magazine at the draw-out position after setting the second roll magazine at the second standby position, while controls the first roll magazine transport means to set the first roll magazine at the first standby position when setting the second roll magazine at the draw-out position and controls the second roll magazine transport means to set the second roll magazine at the draw-out position after setting the first roll magazine at the first standby position."

The third embodiment of the invention is represented by the photographic printing apparatus in the first embodiment having therein a roll magazine transport holding stand which transports the aforesaid first roll magazine transport means and the second roll magazine transport means integrally wherein when the roll magazine transport holding stand slides to the draw-out position, the first roll magazine can be set at the draw-out position and when the roll magazine transport holding stand slides through the draw-out position, the second roll magazine can be set at the draw-out position.

Under the aforesaid constitution, the first roll magazine does not interfere with the second roll magazine, and only a slide of the roll magazine transport holding stand toward the draw-out position makes the first roll magazine to be set at the draw-out position and makes the second roll magazine to be set at the second standby position being away from the aforesaid draw-out position when a photographic light-sensitive material for printing is drawn out of the first roll magazine by the feed-out means, and further the simple slide of the roll magazine transport holding stand toward the draw-out position makes the second roll magazine to be set at the draw-out position and makes the first roll magazine to be set at the first standby position being away from the aforesaid draw-out position when a photographic light-sensitive material for printing is drawn out of the second roll magazine by the feed-out means. Therefore, it is not necessary to control the first roll magazine transport means and the second roll magazine transport means separately, and only control of the slide of the roll magazine transport holding stand is enough.

The first embodiment of the invention attaining the second object is represented by a photographic printing apparatus capable of being set with a first roll magazine and a second roll magazine each being a magazine for roll-shaped photographic light-sensitive materials for printing, wherein there are provided a first feed-out means which draws out a photographic light-sensitive material for printing from a first roll magazine and feeds it in the main body of the photographic printing apparatus, a first cutting means for cutting, in the cross direction, the photographic light-sensitive material for printing drawn out by the first feed-out means, a second feed-out means which draws out a photographic light-sensitive material for printing from a second roll magazine and feeds it in the main body of the photographic printing apparatus, a second cutting means for cutting, in the cross direction, the photographic light-sensitive material for printing drawn out by the second feed-out means, and an accepting means that accepts a photographic light-sensitive material for printing fed out by the first feed-out means, changes its form to accept also a photographic light-sensitive material for printing fed out by the second feed-out means, and transfers it to the downstream side of the transport path for photographic light-sensitive materials for printing.

Under the constitution mentioned above, a photographic light-sensitive material for printing drawn out of the first roll magazine by the first feed-out means is cut in its cross direction by the first cutting means to become a sheet-shaped photographic light-sensitive material for printing, and is fed into the main body of the photographic printing apparatus to be free in handling. Similarly, a photographic light-sensitive material for printing drawn out of the second roll magazine by the second feed-out means is cut in its cross direction by the second cutting means to become a sheet-shaped photographic light-sensitive material for printing, and is fed into the main body of the photographic printing apparatus to be free in handling. Therefore, even when roll axes of roll magazines are not in parallel each other, or even when a center of a roll axis in the direction of a roll width is not in the same plane perpendicular to the roll axis, a sheet-shaped photographic light-sensitive material for printing fed out by the first feed-out means and that fed out by the second feed-out means can be transferred to the downstream side of the transport portion by the accepting means which changes its form. Accordingly, it is possible to eliminate a restriction for placement of roll magazines to realize a photographic printing apparatus capable of being loaded with a plurality of roll magazines which is easy to operate or is compact.

In this case, it is preferable "that the aforesaid first cutting means is inside or in the vicinity of the first feed-out means and the aforesaid second cutting means is inside or in the vicinity of the second feed-out means'.

In this case, a meaning of deformation of the accepting means is that a form of the accepting means is changed totally by deformation of members constituting the accepting means or by a change of positional relations of members constituting the accepting means. The deformation of the accepting means may be "that the accepting means is provided with a transport stand that holds and transports a photographic light-sensitive material for printing and with a transport stand holding means that holds the transport stand to be movable in the direction perpendicular to the transport direction, and the aforesaid transport stand moves in parallel in the direction perpendicular to the transport direction" or it may be "that the aforesaid accepting means is provided with a transport stand that holds and transports a photographic light-sensitive material for printing and with a transport stand holding means that holds the transport stand to be rotatable, and the aforesaid transport stand rotates". Or, the deformation of the accepting means may be "that when the direction in which the accepting means transfers a photographic light-sensitive material for printing to the downstream transport side is called the transport direction, the accepting means is provided with a transport stand that holds and transports a photographic light-sensitive material for printing and with a transport stand holding means which holds the transport stand rotatably so that the transport stand may be held in its transport direction and in the direction perpendicular to the transport direction, and holds the transport stand to be movable in its transport direction, and the transport stand rotates and moves in its transport direction", or it may be "that the accepting means is provided with a transport stand, and the transport stand expands and contracts".

The second embodiment of the invention is represented by the photographic printing apparatus in the first embodiment wherein when the direction in which the accepting means transfers a photographic light-sensitive material for printing to the downstream transport side is called the transport direction, the accepting means is provided with a transport stand that holds and transports a photographic light-sensitive material for printing and with a transport stand holding means that holds the transport stand to be movable in the direction perpendicular to its transport direction, and a meaning of deformation of the accepting means is that the transport stand moves in parallel in the direction perpendicular to its transport direction, and feed-out directions of the first feed-out means and the second feed-out means are in parallel with the transport direction, and a feed-out end of the first feed-out means and that of the second feed-out means are positioned on the same plane perpendicular to the transport direction.

Under the constitution mentioned above, since the feed-out directions of the first feed-out means and the second feed-out means are in parallel with the transport direction, and a feed-out end of the first feed-out means and that of the second feed-out means are positioned on the same plane perpendicular to the transport direction, when the transport stand moves in the direction perpendicular to the transport direction, a photographic light-sensitive material for printing fed out of the first feed-out means as well as a photographic light-sensitive material for printing fed out of the second feed-out means can be accepted.

Incidentally, the feed-out direction means a direction in which a photographic light-sensitive material for printing is fed out by a feed-out means.

The third embodiment of the invention is represented by the photographic printing apparatus in the first embodiment wherein the accepting means is provided with a transport stand that holds and transports a photographic light-sensitive material for printing and with a transport stand holding means that holds the transport stand rotatably, and a meaning of deformation of the accepting means is that the transport stand rotates, and the feed-out direction of the first feed-out means and that of the second feed-out means point to the center of rotation of the transport stand, and feed-out ends of both the first feed-out means and the second feed-out means are located on the same circumference of a circle whose center is an axis of rotation of the transport stand.

Under the constitution mentioned above, since the feed-out direction of the first feed-out means and that of the second feed-out means point to the center of rotation of the transport stand, and feed-out ends of both the first feed-out means and the second feed-out means are located on the same circumference of a circle whose center is an axis of rotation of the transport stand, when the transport stand rotates, a photographic light-sensitive material for printing fed out of the first feed-out means as well as a photographic light-sensitive material for printing fed out of the second feed-out means can be accepted.

The fourth embodiment of the invention is represented by the photographic printing apparatus in the first embodiment wherein when the direction in which the accepting means transfers a photographic light-sensitive material for printing to the downstream transport side is called the transport direction, the accepting means is provided with a transport stand that holds and transports a photographic light-sensitive material for printing and with a transport stand holding means that holds the transport stand rotatably so that the transport stand may be held in its transport direction and in the second direction perpendicular to the transport direction and holds the transport stand to be movable in its transport direction, and a meaning of deformation of the accepting means is that the transport stand rotates and moves in the transport direction, and feed-out directions of the first feed-out means and the second feed-out means are in parallel with the second direction, and a feed-out end of the first feed-out means and that of the second feed-out means are positioned on the same plane perpendicular to the second direction.

Under the constitution mentioned above, since the feed-out directions of the first feed-out means and the second feed-out means are in parallel with the second direction, and a feed-out end of the first feed-out means and that of the second feed-out means are positioned on the same plane perpendicular to the second direction, when the transport stand rotates and is held in the second direction perpendicular to the transport direction, and then moves in the transport direction, a photographic light-sensitive material for printing fed out of the first feed-out means as well as a photographic light-sensitive material for printing fed out of the second feed-out means can be accepted, and moved in the transport direction, then held in the transport direction when the transport stand rotates, and is fed out to the downstream transport side.

The first embodiment attaining the third object of the invention is represented by a photographic printing apparatus capable of being set with a roll magazine that is a magazine for a roll-shaped photographic light-sensitive material for printing wherein a feed-out means that draws out a photographic light-sensitive material for printing from the roll magazine and feeds it in the main body of the photographic printing apparatus and a cutting means that is located in or near the feed-out means and cuts the photographic light-sensitive material for printing drawn out of the roll magazine by the feed-out means in its cross direction, and when switching roll magazines, the photographic light-sensitive material for printing drawn out of the roll magazine is fed back to the roll magazine. Under the constitution mentioned above, since the photographic light-sensitive material for printing drawn out of the roll magazine is fed back to the roll magazine when switching roll magazines, it is possible to switch roll magazines without fogging the photographic light-sensitive material for printing drawn out of the roll magazine. In this case, however, when the photographic light-sensitive material for printing dram out of the roll magazine is simply fed back to the roll magazine, a photographic light-sensitive material for printing wound in the roll magazine is loosened. However, since the photographic light-sensitive material for printing is cut, inside or near the feed-out means, by the cutting means which is located in or near the feed-out means and cuts the photographic light-sensitive material for printing dram out by the feed-out means in its cross direction, the length of the photographic light-sensitive material for printing to be fed back to the roll magazine is not so long as to cause loosening of the wound photographic light-sensitive material for printing.

The second embodiment of the invention is represented by the photographic printing apparatus in the first embodiment having therein a light-shielding means which is located in or near the feed-out means and shields the inside of the photographic printing apparatus against light, wherein roll magazines can be switched quickly without fogging photographic light-sensitive materials for printing in the main body of the photographic printing apparatus even when they exist therein. In this case, it is preferable that the feed-out means doubles as a light-shielding means.

The first embodiment of the invention attaining the fourth object is represented by a photographic printing apparatus having therein a feed-out means for feeding out unexposed sheet-shaped photographic light-sensitive materials for printing, a transport stand which accepts a sheet-shaped photographic light-sensitive material for printing fed out from the feed-out means, then holds it in the course of exposure and transfers it to the downstream transport side, and a downstream transport section that accepts the sheet-shaped photographic light-sensitive material for printing transferred from the transport stand, wherein the transport stand is capable of expanding and contracting to the downstream transport side, capable of rotating around the rotation axis that is in parallel with an optical axis for exposure and is capable of positioning the sheet-shaped photographic light-sensitive material for printing at the position for exposure. Under the aforesaid constitution, since the transport stand is capable of rotating around the rotation axis that is in parallel with an optical axis for exposure, it is possible for the transport stand to position the sheet-shaped photographic light-sensitive material for printing at the position for exposure, by placing it vertically or horizontally for exposure. In this case, when the transport stand is simply rotated around a rotation axis that is in parallel with an optical axis for exposure, the transport stand may come into contact with or hit the downstream transport side if no particular measures are taken on the downstream transport side and others. However, the transport stand can expand and contract in the direction to the downstream transport side, and when it contracts in the course of its rotation, the transport stand neither come into contact with nor hit the downstream transport side, and the photographic light-sensitive material for printing can be placed vertically or horizontally for exposure. Therefore, the photographic light-sensitive material for printing can either be positioned vertically or be positioned horizontally for exposure, without requiring a photographic original to be positioned vertically or horizontally and without requiring separate roll magazines to be set for exposure for photographic light-sensitive materials for printing both in vertical and horizontal positions even for the photographic light-sensitive materials for printing in the same size. Incidentally, the rotation axis that is in parallel with an optical axis for exposure naturally includes the optical axis for exposure itself.

The second embodiment of the invention is represented by the photographic printing apparatus in the first embodiment wherein when the direction in which the accepting means transfers a photographic light-sensitive material for printing to the downstream side of transport path for the photographic light-sensitive material for printing is called the transport direction, the transport stand faces the transport direction, extends to the downstream transport section side, and is under the condition to be able to transfer the sheet-shaped photographic light-sensitive material for printing from the transport stand to the downstream transport section, when exposing a photographic light-sensitive material for printing in the ordinary direction, while when exposing the photographic light-sensitive material for printing in the direction opposite to the ordinary direction, the transport stand is contracted, then it is rotated for positioning, then exposure is made, the transport stand is rotated to be directed in the transport direction, then it is extended to the downstream transport section side and the sheet-shaped photographic light-sensitive material for printing is transferred from the transport stand to the downstream transport section, in this order, and thus, total printing operations can be done efficiently because the transport stand is directed to the transport direction and it is neither contracted nor rotated when exposing the photographic light-sensitive material for printing in the ordinary direction.

The third embodiment of the invention is represented by a photographic printing apparatus wherein a feed-out means that feeds out unexposed sheet-shaped photographic light-sensitive materials for printing, a transport stand that accepts the sheet-shaped photographic light-sensitive materials for printing fed out of the feed-out means, then holds it in the course of exposure, and transfers it to the downstream transport section side, and a downstream transport section that accepts the sheet-shaped photographic light-sensitive materials for printing transferred from the transport stand are provided, and the transport stand is capable of contracting and expanding to the feed-out means side and is capable of rotating around the rotation axis that is in parallel with an optical axis for exposure, and the transport stand is capable of positioning the sheet-shaped photographic light-sensitive materials for printing at the position for exposure.

Under the aforesaid constitution, since the transport stand is capable of rotating around the rotation axis that is in parallel with an optical axis for exposure, it is possible for the transport stand to position the sheet-shaped photographic light-sensitive material for printing at the position for exposure, by placing it vertically or horizontally for exposure. In this case, when the transport stand is simply rotated around a rotation axis that is in parallel with an optical axis for exposure, the transport stand may come into contact with or hit the feed-out means if no particular measures are taken on the feed-out means and others. However, the transport stand can expand and contract in the direction to the feed-out means side, and when it contracts in the course of its rotation, the transport stand neither come into contact with nor hit the feed-out means, and the photographic light-sensitive material for printing can be placed vertically or horizontally for exposure. Therefore, the photographic light-sensitive material for printing can either be positioned vertically or be positioned horizontally for exposure, without requiring a photographic original to be positioned vertically or horizontally and without requiring separate roll magazines to be set for exposure for photographic light-sensitive materials for printing both in vertical and horizontal positions even for the photographic light-sensitive materials for printing in the same size.

The fourth embodiment of the invention is represented by the photographic printing apparatus in the third embodiment wherein when the direction in which the accepting means transfers a photographic light-sensitive material for printing to the downstream side of transport path for the photographic light-sensitive material for printing is called the transport direction, the transport stand faces the transport direction, then it extends to the feed-out means side, and is under the condition to be able to accept the sheet-shaped photographic light-sensitive material for printing from the feed-out means, when exposing a photographic light-sensitive material for printing in the ordinary direction, while when exposing the photographic light-sensitive material for printing in the direction opposite to the ordinary direction, the sheet-shaped photographic light-sensitive material for printing is accepted from the feed-out means under the condition that the transport stand is extended to the feed-out means side, the transport stand is contracted, then it is rotated for positioning, then exposure is made, the transport stand is rotated to be directed in the transport direction, then, the sheet-shaped photographic light-sensitive material for printing is transferred from the transport stand to the downstream transport section side, and thus, total printing operations in the photographic printing apparatus in the third embodiment can be done efficiently because the transport stand is neither contracted nor rotated when exposing the photographic light-sensitive material for printing in the ordinary direction.

The fifth embodiment of the invention is represented by a photographic printing apparatus wherein a feed-out means that feeds out unexposed sheet-shaped photographic light-sensitive materials for printing, a transport stand that accepts the sheet-shaped photographic light-sensitive materials for printing fed out of the feed-out means, then holds it in the course of exposure, and transfers it to the downstream transport section side, and a downstream transport section that accepts the sheet-shaped photographic light-sensitive materials for printing transferred from the transport stand are provided, and when a direction in which a photographic light-sensitive material for printing is transferred to the downstream transport section side by the transport stand is called the transport direction, the transport stand is movable in the transport direction, the transport stand is capable of rotating for positioning around the rotation axis that is in parallel with an optical axis for exposure, and the transport stand is capable of positioning the sheet-shaped photographic light-sensitive materials for printing at the position for exposure.

Under the aforesaid constitution, since the transport stand is capable of rotating around the rotation axis that is in parallel with an optical axis for exposure, it is possible for the transport stand to position the sheet-shaped photographic light-sensitive material for printing at the position for exposure, by placing it vertically or horizontally for exposure. In this case, when the transport stand is simply rotated around a rotation axis that is in parallel with an optical axis for exposure, the transport stand may come into contact with or hit the feed-out means and the downstream transport section if no particular measures are taken on the feed-out means, the downstream transport section and others. So, when the transport stand is rotated after it has moved in the transport direction of the position being away from the feed-out means and the downstream transport section, utilizing that the transport stand becomes movable in the transport direction, the transport stand neither come into contact with nor hit the feed-out means and the downstream transport section, and the photographic light-sensitive material for printing can be placed vertically or horizontally for exposure. In this case, that the transport stand is movable in the transport direction does not mean that feed-out means, the transport stand and the downstream transport section are close each other in the transport direction but it means that there is a room in terms of dimension (See FIG. 11). Therefore, the photographic light-sensitive material for printing can either be positioned vertically or be positioned horizontally for exposure, without requiring a photographic original to be positioned vertically or horizontally and without requiring separate roll magazines to be set for exposure for photographic light-sensitive materials for printing both in vertical and horizontal positions even for the photographic light-sensitive materials for printing in the same size.

The sixth embodiment of the invention is represented by the photographic printing apparatus in the fifth embodiment wherein the procedures for exposing a photographic light-sensitive material for printing in the ordinary direction include, the transport stand is directed in the transport direction, the transport stand is moved to be under the condition to be able to accept a sheet-shaped photographic light-sensitive material for printing from the feed-out means, the transport stand accepts the sheet-shaped photographic light-sensitive material for printing from the feed-out means, the transport stand is moved and located at the exposure position, exposure is made, the transport stand is moved to be under the condition that the sheet-shaped photographic light-sensitive material for printing can be transferred from the feed-out means to the downstream transport section, and the sheet-shaped photographic light-sensitive material for printing is transferred from the feed-out means to the downstream transport section, while, the procedures for exposing a photographic light-sensitive material for printing in the direction perpendicular to the ordinary one include, the transport stand is moved to be under the condition to be able to accept a sheet-shaped photographic light-sensitive material for printing from the feed-out means, the transport stand accepts the sheet-shaped photographic light-sensitive material for printing from the feed-out means, the transport stand is moved and located at the exposure position, the transport stand is rotated to be positioned, exposure is made, the transport stand is rotated to face the transport direction the transport stand is moved to be under the condition that the sheet-shaped photographic light-sensitive material for printing can be transferred from the feed-out means to the downstream transport section, and the sheet-shaped photographic light-sensitive material for printing is transferred from the feed-out means to the downstream transport section, Under the aforesaid constitution, total printing operations in the photographic printing apparatus in the fifth embodiment can be done efficiently because the transport stand is just moved without being rotated when exposing the photographic light-sensitive material for printing in the ordinary direction.

The seventh embodiment of the invention is represented by a photographic printing apparatus wherein a feed-out means that feeds out unexposed sheet-shaped photographic light-sensitive materials for printing, a transport stand that accepts the sheet-shaped photographic light-sensitive materials for printing fed out of the feed-out means, then holds it in the course of exposure, and transfers it to the downstream transport section side, and a downstream transport section that accepts the sheet-shaped photographic light-sensitive materials for printing transferred from the transport stand are provided, and the feed-out means on the transport stand side is capable of retreating, the transport stand is capable of rotating for positioning around the rotation axis that is in parallel with an optical axis for exposure, and the transport stand is capable of positioning the sheet-shaped photographic light-sensitive materials for printing at the position for exposure.

Under the aforesaid constitution, since the transport stand is capable of rotating around the rotation axis that is in parallel with an optical axis for exposure, it is possible for the transport stand to position the sheet-shaped photographic light-sensitive material for printing at the position for exposure, by placing it vertically or horizontally for exposure. In this case, when the transport stand is simply rotated around an optical axis for exposure, the transport stand may come into contact with or hit the feed-out means and others if no particular measures are taken on the feed-out means and others. So, when the transport stand is rotated after the feed-out means on the transport stand side has retreated utilizing that the feed-out means on the transport stand side is capable of retreating, the transport stand neither come into contact with nor hit the feed-out means,, and the photographic light-sensitive material for printing can be placed vertically or horizontally for exposure. Therefore, the photographic light-sensitive material for printing can either be positioned vertically or be positioned horizontally for exposure, without requiring a photographic original to be positioned vertically or horizontally and without requiring separate roll magazines to be set for exposure for photographic light-sensitive materials for printing both in vertical and horizontal positions even for the photographic light-sensitive materials for printing in the same size.

The eighth embodiment of the invention is represented by the photographic printing apparatus in the seventh embodiment wherein the procedures for exposing a photographic light-sensitive material for printing in the ordinary direction include, the feed-out means on the transport stand side does not retreat, the transport stand faces the feed-out direction of the feed-out means, and is under the condition to be able to accept a sheet-shaped photographic light-sensitive material for printing from the feed-out means, while, the procedures for exposing a photographic light-sensitive material for printing in the direction perpendicular to the ordinary one include, the transport stand accepts the sheet-shaped photographic light-sensitive material for printing from the feed-out means, the feed-out means retreats, the transport stand is rotated to be positioned, exposure is made, the transport stand is rotated to face the feed-out direction, and the feed-out means is made to be under the condition of no retreating in which the sheet-shaped photographic light-sensitive material for printing can be accepted from the feed-out means.

Under the aforesaid constitution, total printing operations in the photographic printing apparatus in the seventh embodiment can be done efficiently because the feed-out means does not retreat and the transport stand is not rotated when exposing the photographic light-sensitive material for printing in the ordinary direction.

The ninth embodiment of the invention is represented by a photographic printing apparatus wherein a feed-out means that feeds out unexposed sheet-shaped photographic light-sensitive materials for printing, a transport stand that accepts the sheet-shaped photographic light-sensitive materials for printing fed out of the feed-out means, then holds it in the course of exposure, and transfers it to the downstream transport section side, and a downstream transport section that accepts the sheet-shaped photographic light-sensitive materials for printing transferred from the transport stand are provided, and the downstream transport section on the transport stand side is retractable, the transport stand is capable of rotating for positioning around the rotation axis that is in parallel with an optical axis for exposure, and the transport stand is capable of positioning the sheet-shaped photographic light-sensitive materials for printing at the position for exposure.

Under the aforesaid constitution, since the transport stand is capable of rotating around the rotation axis that is in parallel with an optical axis for exposure, it is possible for the transport stand to position the sheet-shaped photographic light-sensitive material for printing at the position for exposure, by placing it vertically or horizontally for exposure. In this case, when the transport stand is simply rotated around the rotation axis that is in parallel with an optical axis for exposure, the transport stand may come into contact with or hit the downstream transport section and others if no particular measures are taken on the downstream transport section and others. So, when the transport stand is rotated after the downstream transport section on the transport stand side has retreated utilizing that the downstream transport section on the transport stand side is retractable, the transport stand neither come into contact with nor hit the downstream transport section, and the photographic light-sensitive material for printing can be placed vertically or horizontally for exposure. Therefore, the photographic light-sensitive material for printing can either be positioned vertically or be positioned horizontally for exposure, without requiring a photographic original to be positioned vertically or horizontally and without requiring separate roll magazines to be set for exposure for photographic light-sensitive materials for printing both in vertical and horizontal positions even for the photographic light-sensitive materials for printing in the same size.

The tenth embodiment of the invention is represented by the photographic printing apparatus in the ninth embodiment wherein when the direction in which the accepting means transfers a photographic light-sensitive material for printing to the downstream side of transport path for the photographic light-sensitive material for printing is called the transport direction, the downstream transport section on the transport stand side does not retreat and the transport stand faces the transport direction to be in the state that the sheet-shaped photographic light-sensitive material for printing can be transferred to the downstream transport section side, while, when exposing a photographic light-sensitive material for printing in the direction perpendicular to the ordinary direction, the downstream transport section retreats, the transport stand is rotated to be positioned, exposure is made, the transport stand is rotated to be directed in the transport direction, the downstream transport section is made to be under the condition of no retreating in which the sheet-shaped photographic light-sensitive material for printing can be transferred from the transport stand to the downstream transport section, and the sheet-shaped photographic light-sensitive material for printing is transferred from the transport stand to the downstream transport section.

Under the aforesaid constitution, total printing operations in the photographic printing apparatus in the ninth embodiment can be done efficiently because the feed-out means does not retreat and the transport stand is not rotated when exposing the photographic light-sensitive material for printing in the ordinary direction.

The first embodiment for attaining the fifth object is represented by a roll magazine holder capable of housing a first magazine and a second magazine both representing a magazine for a roll-shaped photographic light-sensitive material for printing, wherein, when a position of the roll magazine from which a photographic light-sensitive material for printing to be fed in the main body of a photographic printing apparatus is drawn out is called a draw-out position, a first roll magazine transport means that transports the aforesaid first roll magazine between the aforesaid draw-out position and the first standby position that is away from the aforesaid draw-out position, and a second roll magazine transport means that transports the aforesaid second roll magazine between the aforesaid draw-out position and the second standby position that is away from the aforesaid draw-out position are provided, and the aforesaid first standby position is away from the second standby position. Under the constitution mentioned above, when a photographic light-sensitive material for printing is drawn out of the first roll magazine by the aforesaid feed-out means, the first roll magazine is set at the draw-out position and the second roll magazine is set at the second standby position which is away from the aforesaid draw-out position. Further, when a photographic light-sensitive material for printing is drawn out of the second roll magazine by the aforesaid feed-out means, the second roll magazine is set at the draw-out position and the first roll magazine is set at the first standby position which is away from the aforesaid draw-out position. Therefore, the first roll magazine does not interfere with the second roll magazine. Further, a photographic light-sensitive material for printing in the first roll magazine and that in the second roll magazine are drawn out by the same and common feed-out means. Therefore, photographic light-sensitive materials for printing can be supplied from a plurality of roll magazines despite less number of members in the feed-out means.

The second embodiment is represented by a roll magazine holder in the first embodiment wherein when setting the first roll magazine at the draw-out position, the second roll magazine transport means is transported for setting the second roll magazine at the second standby position, and after setting the second roll magazine at the second standby position, the first roll magazine transport means is transported for setting the first roll magazine at the draw-out position, while when setting the second roll magazine at the draw-out position, the first roll magazine transport means is transported for setting the first roll magazine at the first standby position, and after setting the first roll magazine at the first standby position, the second roll magazine transport means is transported for setting the second roll magazine at the draw-out position.

Under the constitution mentioned above, when setting the first roll magazine at the draw-out position, the second roll magazine is set at the second standby position and then the first roll magazine is set at the draw-out position. Therefore, the first roll magazine does not interfere with the second roll magazine. Similarly, when setting the second roll magazine at the draw-out position, the first roll magazine is set at the first standby position and then the second roll magazine is set at the draw-out position. Therefore, the second roll magazine does not interfere with the first roll magazine. Therefore, a photographic light-sensitive material for printing in the first roll magazine and that in the second roll magazine are drawn out by the common feed-out means without interference between the first roll magazine and the second roll magazine, which makes it possible to switch automatically the roll magazines capable of supplying photographic light-sensitive materials for printing from a plurality of roll magazines with less number of members in the feed-out means.

The third embodiment of the invention is represented by the photographic printing apparatus in the first embodiment having therein a roll magazine transport holding stand which transports the aforesaid first roll magazine transport means and the second roll magazine transport means integrally wherein when the roll magazine transport holding stand slides to the draw-out position, the first roll magazine can be set at the draw-out position and when the roll magazine transport holding stand slides through the draw-out position, the second roll magazine can be set at the draw-out position.

Under the aforesaid constitution, the first roll magazine does not interfere with the second roll magazine, and the first roll magazine is set at the draw-out position and the second roll magazine is set at the second standby position being away from the aforesaid draw-out position when a photographic light-sensitive material for printing is drawn out of the first roll magazine by the feed-out means, and further the second roll magazine is set at the draw-out position and the first roll magazine is set at the first standby position being away from the aforesaid draw-out position when a photographic light-sensitive material for printing is drawn out of the second roll magazine by the feed-out means. Therefore, it is not necessary to control the first roll magazine transport means and the second roll magazine transport means separately, and only control of the slide of the roll magazine transport holding stand is enough.

BRIEF DESCRIPTION OF THE DRAWINGS

FIG. 21 (B) is a diagram showing an example wherein suction holes in FIG. 13 are covered.

FIG. 21 (C) is a diagram showing another example wherein suction holes are covered.

DETAILED DESCRIPTION OF THE INVENTION

Figure 1:
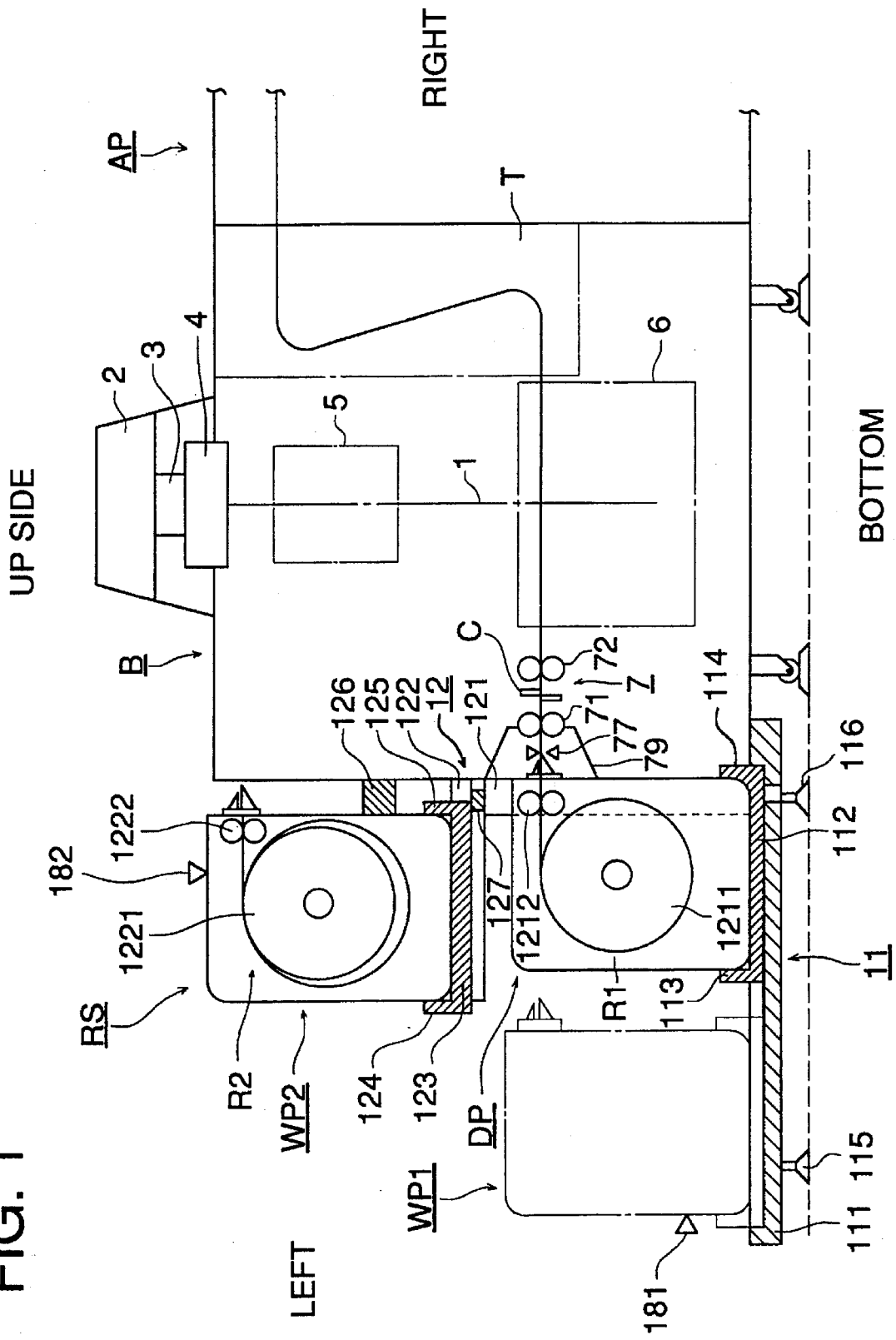
FIG. 1 is a schematic structure diagram of a photographic printing apparatus in Example 1.

Constituent factors which are common in the present invention will be explained as follows. Terms which are common in the invention will be explained as follows, first.

A photographic printing apparatus is an apparatus for printing equipped with an exposure system. Printing includes projection printing wherein a photographic image of a photographic original is projected on a photographic light-sensitive material for printing for exposure and scanning printing wherein a photographic light-sensitive material for printing is exposed to a photographic image of a photographic original through scanning. The projection printing includes contact printing wherein a photographic original is brought into contact with a photographic light-sensitive material for printing for exposure and protection printing in a narrow sense wherein a photographic image of a photographic original is projected and focused on a photographic light-sensitive material for printing for exposure. The photographic original is a medium on which an original image to be printed is recorded as a form of a photograph. With regard to photographic originals, on most of them, there are recorded a plurality of frames of original images, although some of them show an occasion wherein one frame of an original image is recorded on each of them, A frame, in this case, means one division of an image. A photographic original includes a monochromatic photographic original wherein an original image to be copied is recorded in a form of a monochromatic photograph and a color photographic original wherein an original image to be copied is recorded in a form of a color photograph. Further, the photographic original includes a transmission-type original wherein photographic images are formed on a transparent film such as a processed photographic film or on a transparent support such as a glass plate and a reflection type original wherein photographic images are formed on an opaque support such as paper.

A photographic light-sensitive material for printing is a photographic light-sensitive material on which photographic images are formed through printing. The photographic light-sensitive material for printing includes a photographic paper whose support is paper and a photographic film that is a photographic light-sensitive material whose support is a film base. As a photographic light-sensitive material for printing, a silver halide photographic light-sensitive material is highly sensitive and is excellent in gradation reproducibility, which is preferable. Further, the silver halide photographic light-sensitive material is preferable because it is excellent in color reproducibility.

DETAILED DESCRIPTION OF THE PREFERRED EMBODIMENTS

Concrete examples of the invention will be explained as follows, as an example. Incidentally, for simplifying the explanation, symbols of UPSIDE, BOTTOM, LEFT and RIGHT which mean respectively the upside, bottom, left side and right side of the photographic printing apparatus are given on FIG. 1 and symbols of REAR, FRONT, LEFT and RIGHT which mean respectively the rear side, front side, left side and right side of the photographic printing apparatus are given on FIG. 8. A sheet-shaped photographic paper is transported normally from the left-hand side to the right-hand side. Though there is described in the examples that a processed silver halide color photographic light-sensitive film (hereinafter referred to simply as a color film) having therein a plurality of frames each having thereon photographic images which is a color photographic transmission type original is used in a photographic printing apparatus, and a sheet-shaped photographic paper that is a silver halide color photographic light-sensitive material is used therein as a photographic light-sensitive material for printing, the invention is not limited thereto.

Figure 2:
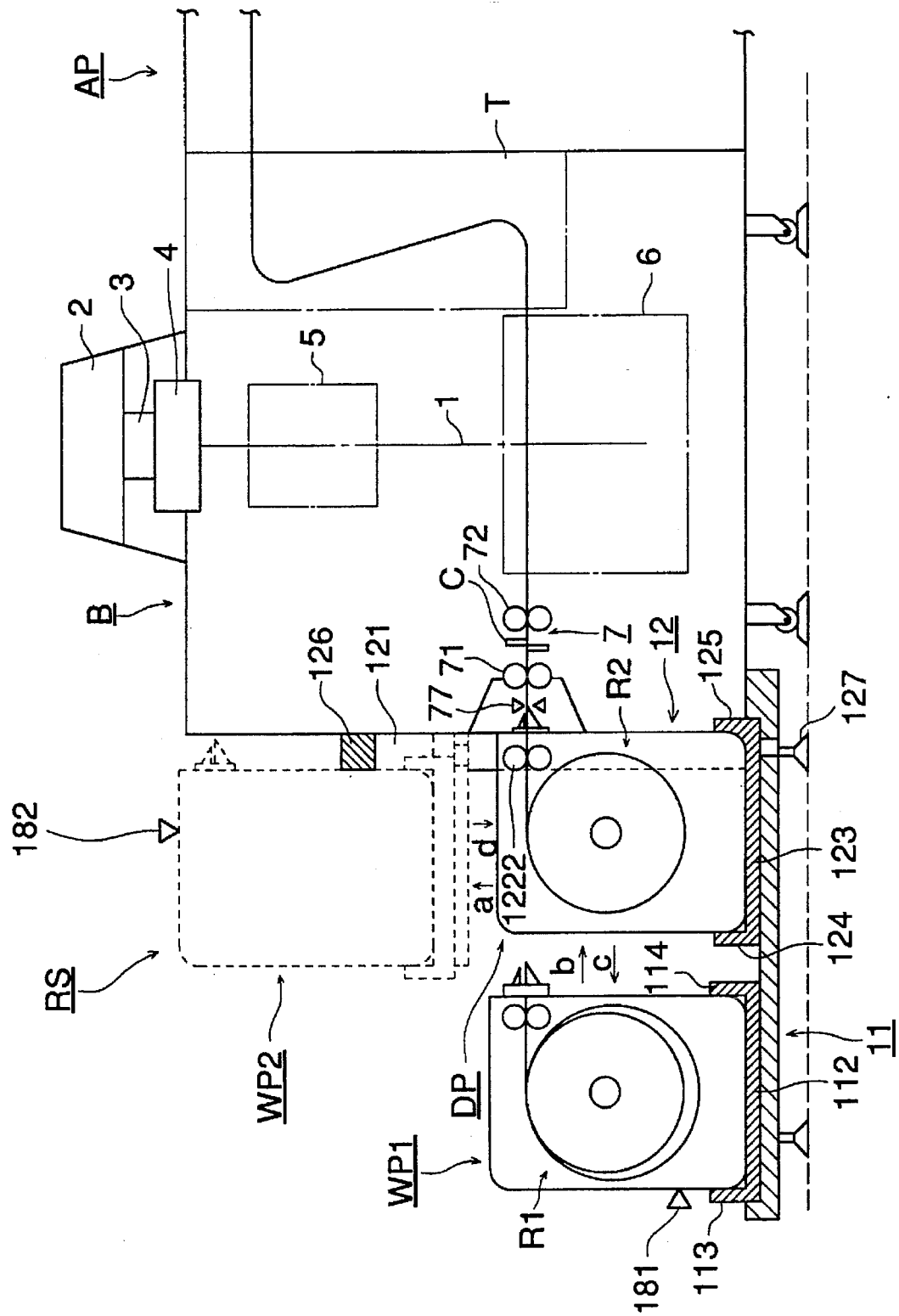
FIG. 2 is an illustration for operations of the photographic printing apparatus in Example 1.

FIG. 1 is a schematic structure diagram showing roll magazine holder RS of a photographic printing apparatus in the example, the schematic structure of main body B of the photographic printing apparatus and connection of the photographic printing apparatus to automatic processing machine AP. FIG. 2 is a diagram showing a sequence of movement of the roll magazine holder RS in the present example.

First, an explanation will be made along an exposure optical path in photographic printing apparatus main body B in FIG. 1. Exposure optical path 1 in the photographic printing apparatus main body B is perpendicular. Light from a light source of lamp house 2 illuminates a color film held in negative carrier 4 through diffusion box 3. Zoom lens 5 housing therein a diaphragm and a shutter forms images on the color film held on the negative carrier 4 on a sheet-shaped photographic paper. At the lower portion of the exposure optical path of the zoom lens 5, there is positioned transport stand 6 which holds photographic paper P at the focusing position of the zoom lens 5.

Next, an explanation will be made along a transport path for a photographic paper in photographic printing apparatus main body B in FIG. 1. It is possible to set the first roll magazine R1 and the second roll magazine R2 on roll magazine holder RS. In each of these roll magazines, there is loaded a roll-shaped photographic paper. In this case, a position of a roll magazine from which a photographic paper to be fed into the photographic printing apparatus main body B is drawn out is called draw-out position DP. Feed-out means 7 takes out a photographic paper from a roll magazine set at the draw-out position DP (first roll magazine R1 in FIG. 1), and feeds it into the photographic printing apparatus main body B. In the feed-out means 7, there is provided cutting means C. Photographic paper taken out is cut into a sheet-shaped photographic paper by the cutting means C. Transport stand 6 accepts a sheet-shaped photographic paper fed out by the feed-out means 7, then makes it to be exposed at an exposure position, and feeds it to downstream transport section T. The downstream transport section T accepts a sheet-shaped photographic paper from the transport stand 6, and transports it to automatic processing machine AP. The automatic processing machine AP processes the transported sheet-shaped photographic paper.

The feed-out means 7 has therein a pair of rollers 71 and a pair of rollers 72 which follow the former. A pair of rollers 71 located in the feed-out means 7 represent rubber rollers in each of which elastic carbon black is dispersed, and they are in pressure contact each other, thus, elastic deformation caused by the pressure contact prevents light from leaking through the rollers. Further, a pair of rollers 71 are also in pressure contact with light-shielding wall 79, and elastic deformation caused by the pressure contact prevents light from leaking through the light-shielding wall 79 and a pair of rollers 71, similarly. Therefore, a pair of rollers 71 in the feed-out means 7 and the light-shielding wall 79 constitute a light-shielding means that shields the inside of the photographic printing apparatus main body B against light. The cutting means C is located inside the feed-out means 7, namely, between a pair of rollers 71 and a pair of rollers 72. The cutting means C is one which cuts a photographic paper drawn out by the feed-out means 7 in its cross direction. When a pair of rollers 71 rotate reversely, the feed-out means 7 can also return to the roll magazine a photographic paper on the roll magazine side drawn out of the roll magazine and cut by the cutting means C. When returning the photographic paper to the roll magazine, a control means for the roll magazine holder RS makes a pair of feeding rollers 1212 or (second roll magazine R2) 1222 of a roll magazine (first roll magazine R1 in FIG. 1) located at draw-out position DP to rotate reversely. Further, there is provided entrance section sensor 77 which detects existence of a photographic paper located to be closer to an entrance than a pair of rollers 71. The entrance section sensor generates ON signals during a period of existence of a photographic paper, such as a period when a photographic paper is being fed into the photographic printing apparatus main body B from a roll magazine, while it generates OFF signals when no photographic paper exists.

Let it be assumed that a position of the first roll magazine R1 which is for standby or replacement of the first roll magazine R1 is called first standby position WP1. The first standby position WP1 is away from draw-out position DP. First roll magazine transport means 11 transports the first roll magazine R1 between the first standby position WP1 and the draw-out position DP. The first roll magazine transport means 11 is composed of holding stand 111 and first moving stand 112 that moves on the holding stand 111 in the horizontal direction (longitudinal direction of an apparatus) between the first standby position WP1 and the draw-out position DP while holding the first roll magazine R1. The holding stand 111 is supported by legs 115 and 116. The first moving stand 112 is provided with plate 114 by which the right end of the first roll magazine R1 is fixed and with plate 113 by which the left end thereof is fixed. Further, there is provided detection means 181 which detects that the first roll magazine is set at the first standby position WP1.

Let it be assumed that a position of the second roll magazine R2 which is for standby or replacement of the second roll magazine R2 is called second standby position WP2. The second standby position WP2 is away from draw-out position DP. Second roll magazine transport means 12 transports the second roll magazine R2 between the second standby position WP2 and the draw-out position DP. The second roll magazine transport means 12 is composed of rail 121, moving stand 112 that moves vertically between the second standby position WP2 and draw-out position DP, and of second moving stand 123 that moves on the moving stand 122 in the horizontal direction (longitudinal direction of an apparatus) between the second standby position WP2 and the draw-out position DP while holding the second roll magazine R2. The rail 121 is composed of two rails located at front and rear. A bottom portion of each rail is fixed at the front or rear of the holding stand 111. A top portion of each rail is fixed at the front or rear of supporting bar 126. These rail 121, holding stand 111 and supporting bar 126 constitute a frame body of roll magazine holder RS. The moving stand 122 supports the second moving stand 123 only in the vicinity of the rail 121, and they are united integrally by moving stand connection bar 127. The second moving stand 123 is provided with plate 125 that fixes the right end of the second roll magazine R2 and plate 124 that fixes the left end thereof. Further, there is provided detection means 182 that detects that the second roll magazine is set at the second standby position WP2.

The first standby position WP1 is away from the second standby position WP2. Therefore, when the first roll magazine R1 is located at the first standby position WP1, it does not interfere with second roll magazine R2 transported between the second standby position WP2 and draw-out position DP, because the first standby position WP1 is away from the draw-out position DP. Even when the second roll magazine R2 is located at the second standby position WP2, it does not interfere with the first roll magazine R1 that is transported between the first standby position WP1 and draw-out position DP, because the second standby position WP2 is away from the draw-out position DP. Further, the second or the first roll magazine can move only when the detection means 181 or 182 at the aforesaid standby position detects.

Next, operations in the present example will be explained as follows, referring to FIG. 2. Generally, a leading edge of a photographic paper drawn out of a roll magazine is positioned at a point where the photographic paper is cut by cutting means C. When switching roll magazines, an unillustrated control means on photographic printing apparatus main body B rotates a pair of rollers 71 of feed-out means 7 reversely, and thereby feeds the photographic paper drawn out of the roll magazine back to the roll magazine until the leading edge of the photographic paper is retracted in roll magazine R1 or R2, namely, until the photographic paper is transported over a prescribed distance by OFF signals generated by entrance portion sensor 77. In this case, the control means of the photographic printing apparatus main body B controls an unillustrated control means on roll magazine holding means RS to rotate reversely a pair of feed rollers 1212 or 1222 of roll magazine R1 or R2 located at draw-out position DP. Due to this, when switching roll magazines, the roll magazines can be switched without any problem that a photographic paper drawn out of a roll magazine is fogged, because the photographic paper drawn out of the roll magazine is fed back to the roll magazine. Namely, a roll magazine can be moved only when rewinding of a photographic paper has been detected.

The aforesaid control means on photographic printing apparatus main body B controls the aforesaid control means on roll magazine holder RS. The following symbols a, b, c and d correspond respectively to a, b, c and d in FIG. 2. When setting first roll magazine R1 at draw-out position DP through the control means on roll magazine holder RS, the control is made as follows.

a. Second roll magazine transport means 12 is moved upward to set second roll magazine R2 at second standby position WP2.

b. Then, after the detection means 182 has detected that the second roll magazine R2 is set at the second standby position WP2, the first roll magazine transport means 11 is transported to the right-hand side to set the first roll magazine R1 at the draw-out position DP.

When setting the second roll magazine at draw-out position DP through a control means on the roll magazine holder RS, the control is made as follows.

c. The first roll magazine transport means 11 is transported to the left-hand side to first roll magazine R1 at first standby position WP1.

d. Then, after the detection means 181 has detected that the first roll magazine R1 is set at the first standby position WP1, the second roll magazine transport means 12 is moved downward to set the second roll magazine R2 at the draw-out position DP.

EXAMPLE 2

Figure 3:
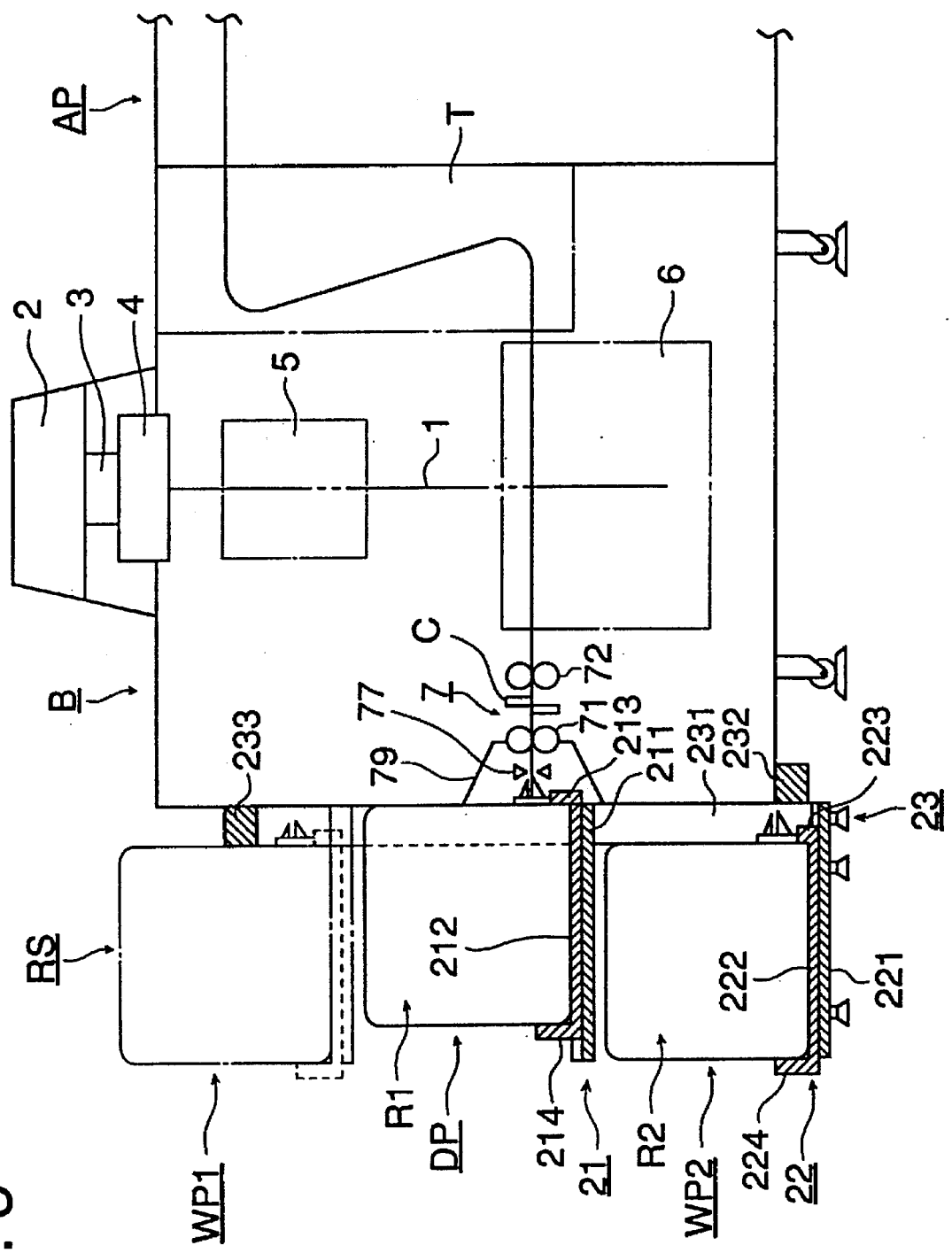
FIG. 3 is a schematic structure diagram of a photographic printing apparatus in Example 2.
Figure 4:
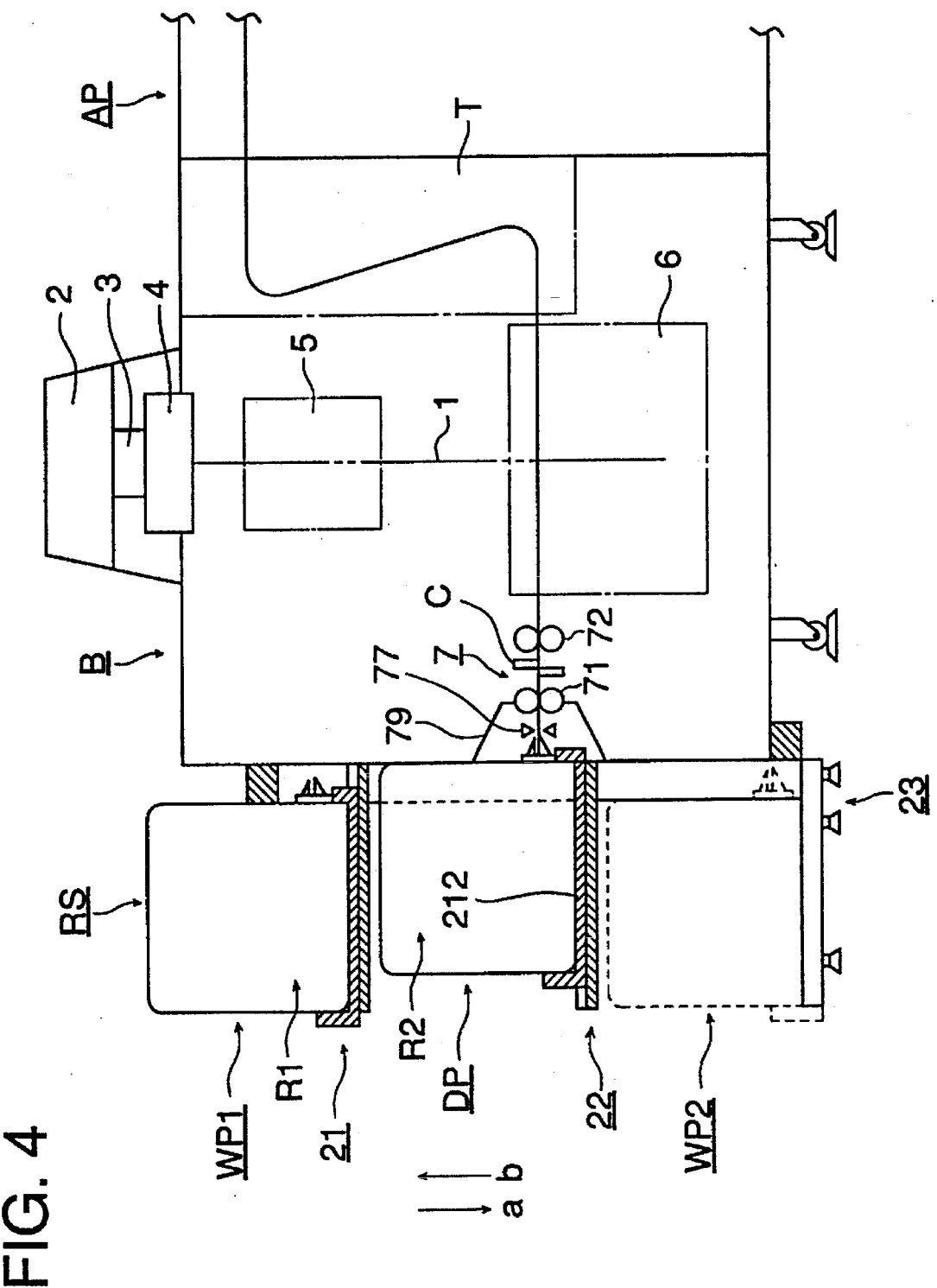
FIG. 4 is an illustration for operations of the photographic printing apparatus in Example 2.

FIG. 3 is a schematic structure diagram showing schematic structure of roll magazine holder RS and photographic printing apparatus main body B both of a photographic printing apparatus of the present example and showing connection of them with automatic processing machine AP. FIG. 4 is a diagram showing sequence of movements of roll magazine holding stand RS in the present example. The photographic printing apparatus in the example is an example wherein only roll magazine holder RS in Example 1 has been changed. The roll magazine holder RS and main points changed from Example 1 will be described as follows.

On the roll magazine holder RS, both the first roll magazine R1 and the second roll magazine R2 can be set. Further, when feeding a photographic paper back in a roll magazine, a control means of the roll magazine holder RS makes a pair of feeding rollers of a roll magazine (the first roll magazine R1 in FIG. 3) located at draw-out position DP to rotate reversely.

Let it be assumed that a position of the first roll magazine R1 which is for standby or replacement of the first roll magazine R1 is called first standby position WP1. The first standby position WP1 is away from draw-out position DP.

First roll magazine transport means 21 transports the first roll magazine R1 between the first standby position WP1 and the draw-out position DP. The first roll magazine transport means 21 is provided with first moving and holding stand 211 and first moving stand 212 that moves in the first moving and holding stand 211. The first moving and holding stand 211 moves along rail 231 vertically (up-and-down direction of an apparatus) between the first standby position WP1 and the draw-out position DP while holding the first moving stand 212. The first moving stand 212 moves horizontally (longitudinal direction of an apparatus) between the first standby position WP1 and the draw-out position DP while holding the first roll magazine R1. The first moving stand 212 is provided with plate 213 that fixes the right end of the first roll magazine R1 and plate 214 that fixes the left end thereof.

Let it be assumed that a position of the second roll magazine R2 which is for standby or replacement of the second roll magazine R2 is called first standby position WP2. The second standby position WP2 is away from draw-out position DP. Second roll magazine transport means 22 transports the second roll magazine R2 between the second standby position WP2 and the draw-out position DP. The second roll magazine transport means 22 is provided with second moving and holding stand 221 and second moving stand 222 that moves in the second moving and holding stand 221. The second moving and holding stand 221 moves along rail 231 vertically (up-and-dom direction of an apparatus) between the second standby position WP2 and the draw-out position DP while holding the second moving stand 222. The second moving stand 222 moves horizontally (longitudinal direction of an apparatus) between the second standby position WP2 and the draw-out position DP while holding the second roll magazine R2. The second moving stand 222 is provided with plate 223 that fixes the right end of the second roll magazine R2 and plate 224 that fixes the left end thereof.

The rail 231 is composed of two rails located at front and rear. A bottom portion of each rail is fixed at the front or rear of the holding stand 232. A top portion of each rail is fixed at the front or rear of supporting bar 233. These rail 231, holding stand 232 and supporting bar 233 constitute a frame body of roll magazine holder RS. The front and rear of the holding stand 232 are connected in the vicinity of the rail 231. The first moving and holding stand 211 and the second moving and holding stand 221 are combined and they move in one united body. Namely, the first roll magazine transport means 21 and the second roll magazine transport means 22 constitute a united roll magazine transport holding stand. The first moving and holding stand 211 of this roll magazine transport holding stand corresponds to a first roll magazine holding section in the third embodiment for attaining the first object of the invention.

When the roll magazine transport holding stand slides to draw-out position DP, the first moving and holding stand 211 can be set at the draw-out position DP, while, when the roll magazine transport holding stand slides to the draw-out position DP, the second moving and holding stand 221 can be set at the draw-out position DP. Therefore, even when the roll magazine transport holding stand slides to the draw-out position, the first roll magazine R1 and the second roll magazine R2 do not interfere with each other.

Next, operations in the present example will be explained as follows, referring to FIG. 4. Generally, a leading edge of a photographic paper drawn out of a roll magazine is positioned at a point where the photographic paper is cut by cutting means C. When switching roll magazines, a control means on photographic printing apparatus main body B rotates a pair of rollers 71 of feed-out means 7 reversely, and thereby feeds the photographic paper drawn out of the roll magazine back to the roll magazine until the leading edge of the photographic paper is retracted in roll magazine R1 or R2, namely, until the photographic paper is transported over a prescribed distance by OFF signals generated by entrance portion sensor 77. In this case, the control means of the photographic printing apparatus main body B controls a control means on roll magazine holding means RS and the control means of the roll magazine holder RS rotates reversely a pair of feed rollers of roll magazine R1 or R2 located at draw-out position DP. Due to this, when switching roll magazines, the roll magazines can be switched without any problem that a photographic paper drawn out of a roll magazine is fogged, because the photographic paper drawn out of the roll magazine is fed back to the roll magazine.

The aforesaid control means on photographic printing apparatus main body B controls a control means on roll magazine holder RS. When setting the first roll magazine R1 at the draw-out position DP through the control means of the roll magazine holder RS, a. the second roll magazine R2 is set at the second standby position WP2, and control is made to make a roll magazine transport holding stand to slide to draw-out position DP (lower direction a) so that the first roll magazine R1 may be set the draw-out position DP.

When setting second roll magazine R2 at draw-out position DP through the control means on roll magazine holder RS, b. the first roll magazine R1 is set at the first standby position WP1, and control is made to make a roll magazine transport holding stand to slide to draw-out position DP (upper direction b) so that the second roll magazine R2 may be set the draw-out position DP.

EXAMPLE 3

Figure 5:
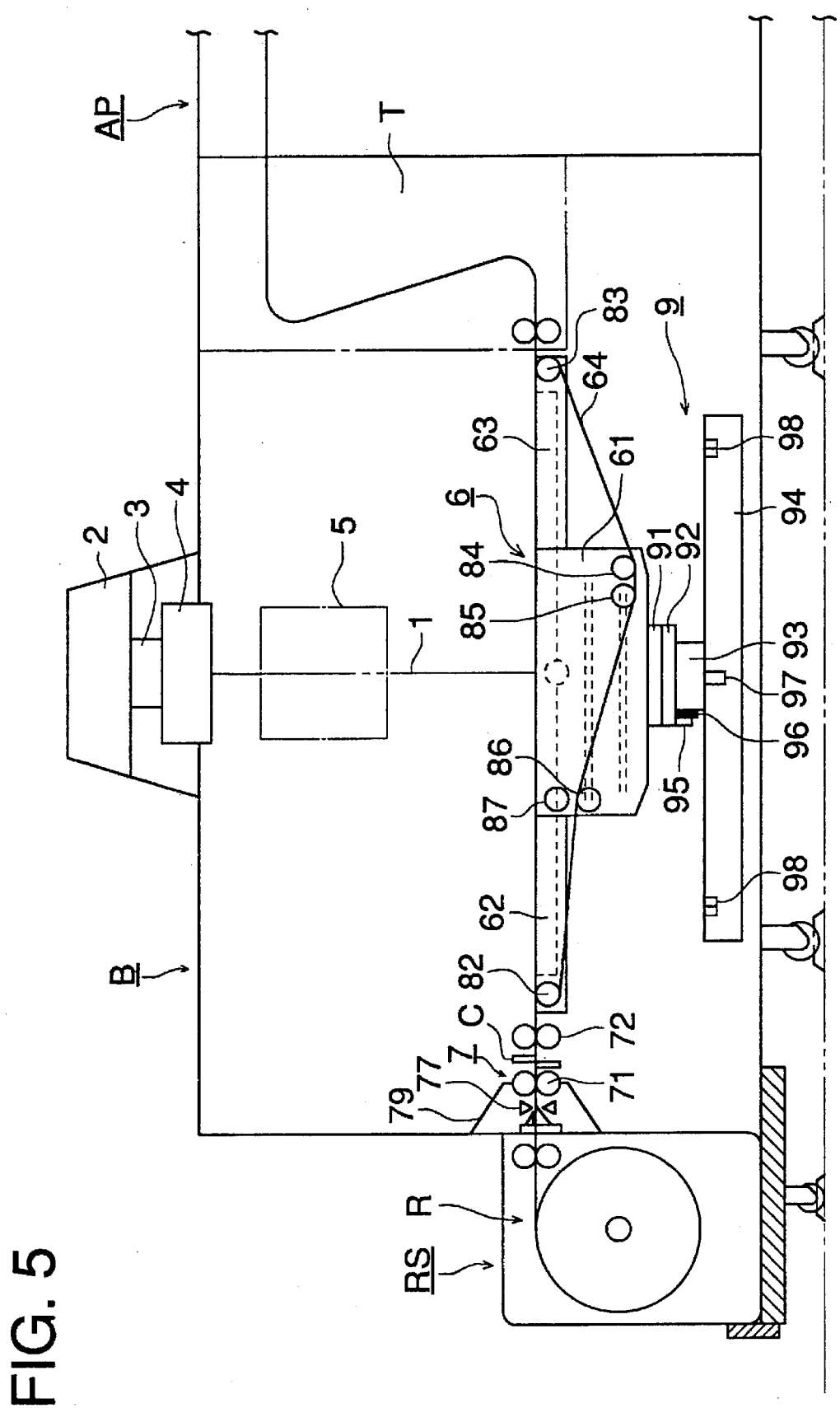
FIG. 5 is a schematic structure diagram of a photographic printing apparatus in Example 3.

FIG. 5 is a schematic structure diagram showing schematic structure of roll magazine holder RS and photographic printing apparatus main body B both of a photographic printing apparatus of the present example and showing connection of them with automatic processing machine AP.

First, there will be given an explanation along an optical path for exposure in photographic printing apparatus main body B shown in FIG. 5. An optical axis for exposure 1 in the photographic printing apparatus main body B is perpendicular. Light from lamp house 2 which is a light source section in the photographic printing apparatus main body B illuminates, through diffusion box 3 which is a means for making a surface light source that creates a uniform surface light source, a color film held in negative carrier 4 which is a photographic original holding means that holds a photographic original. Zoom lens 5 housing therein a diaphragm and a shutter forms images on the color film F held on the negative carrier 4 on a sheet-shaped photographic paper. At the lower portion of the exposure optical path of the zoom lens 5, there is positioned transport stand 6 which holds photographic paper P at the focusing position of the zoom lens 5.

Figure 6:
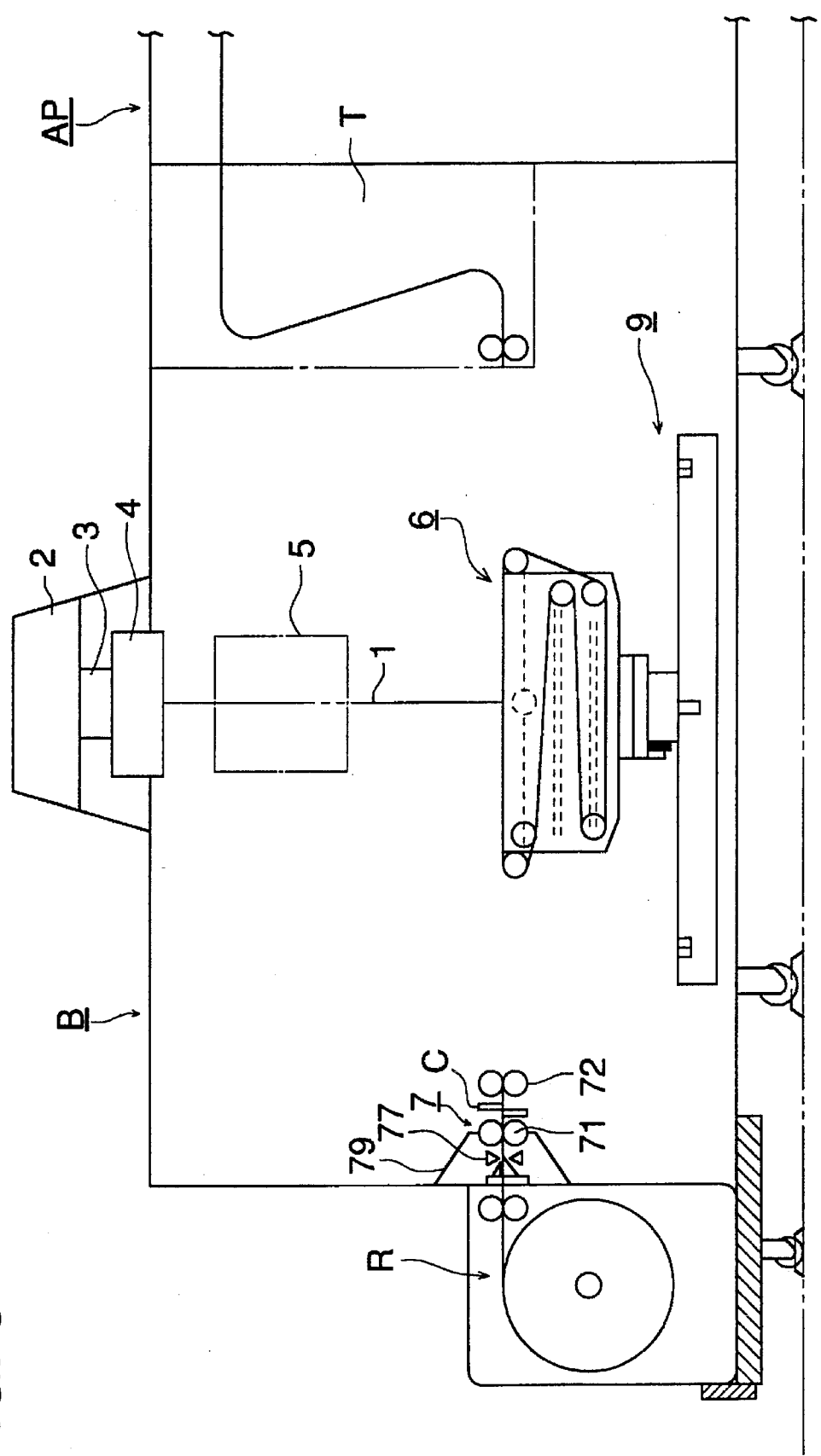
FIG. 6 is a diagram showing a contracted transport stand in the photographic printing apparatus in Example 3.
Figure 7:
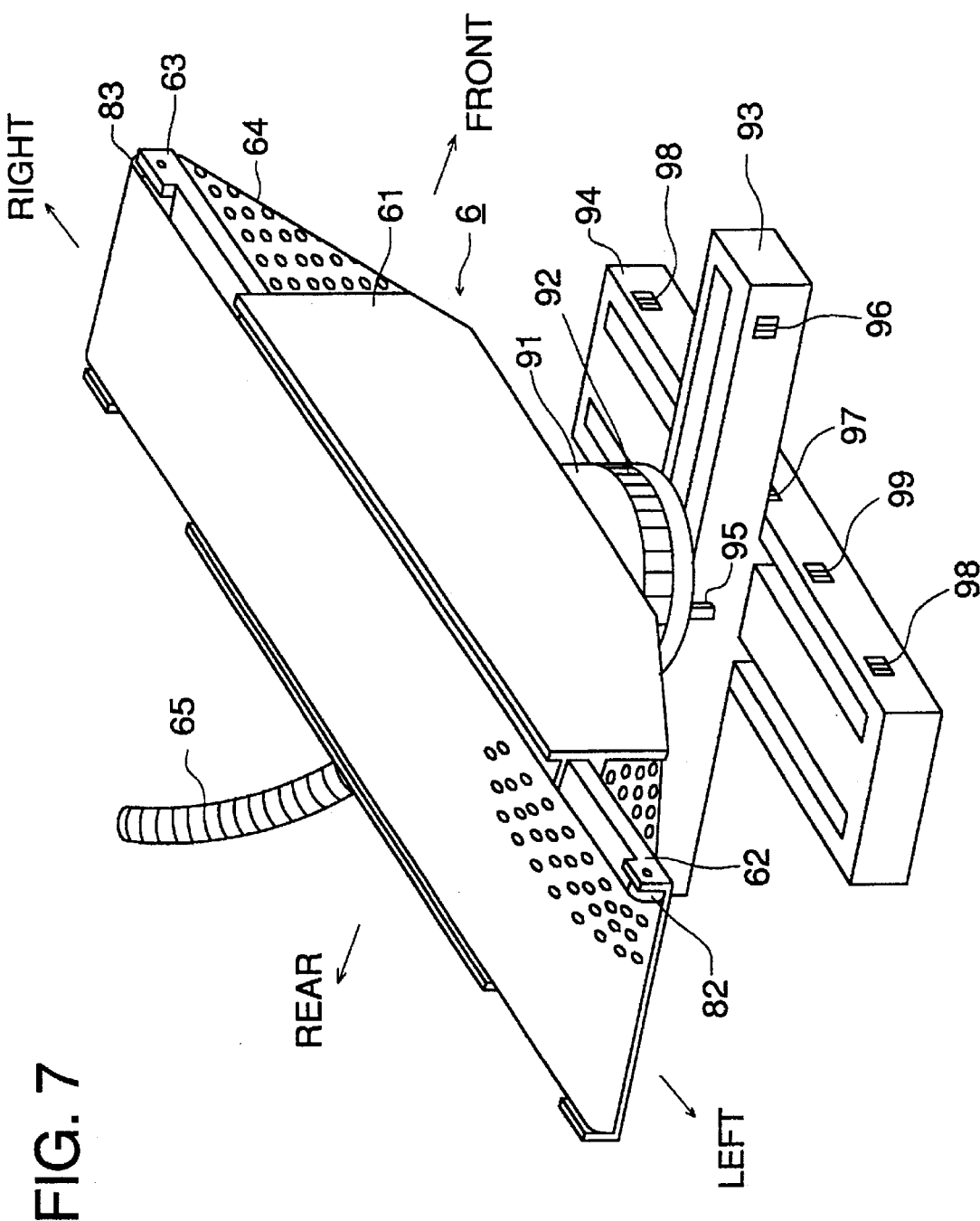
FIG. 7 is a perspective view of the transport stand in the photographic printing apparatus in Example 3.
Figure 8:
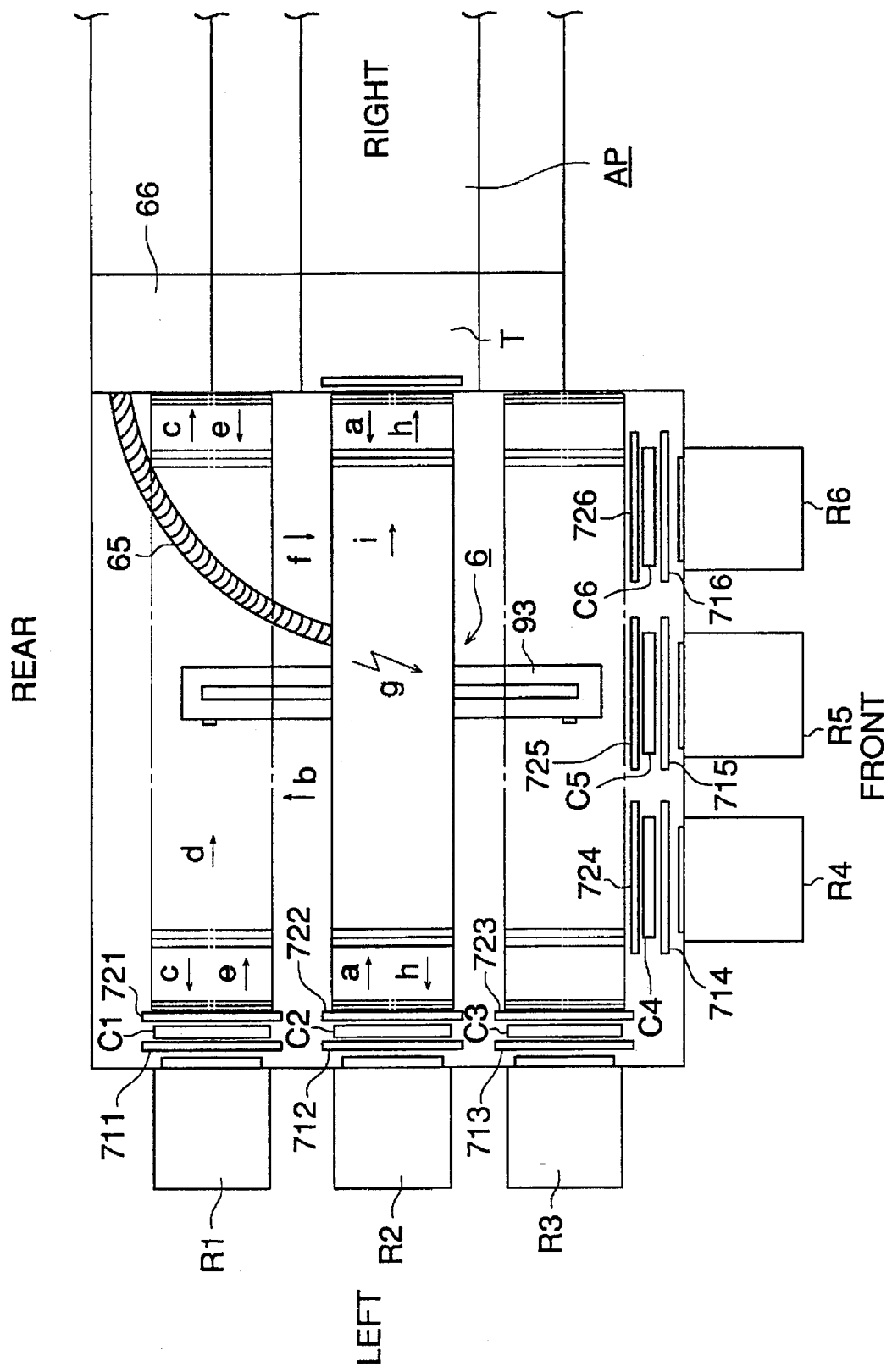
FIG. 8 is an illustration for operations of the photographic printing apparatus in Example 3.

On the transport stand 6, there are provided, as shown in FIGS. 5 and 7, suction table 61, suction table expandable to feed-out means side 62, suction table expandable to downstream transport section side 63, suction hose 65, photographic paper adhesion transport belt 64, belt roller of expandable suction table at feed-out means side 82, belt roller of suction table expandable to downstream transport section side 83, belt rollers of suction table 84 and 87, damper rollers 85 and 86 and transport stand holding means 9. A top face of the suction table 61 is a highly accurate plane. The suction table expandable to feed-out means side 62 is of a nesting structure for the suction table 61 and extends to the feed-out means side of the suction table 61. The suction table expandable to downstream transport section side 63 is of a nesting structure for the suction table 61 and extends to the downstream transport section side of the suction table 61. As shown in FIGS. 5 and 8, the suction hose 65 is for creating the decompressed state on the suction table 61, the suction table expandable to feed-out means side 62, and the suction table expandable to downstream transport section side 63 by means of suction pump 66. The photographic paper adhesion transport belt 64 transports a sheet-shaped photographic paper while attracting it under the decompressed condition through the suction table 61, the suction table expandable to feed-out means side 62, and the suction table expandable to downstream transport section side 63. By means of an unillustrated photographic paper position detection means, it is possible to position a photographic paper at an exposure position on the suction table 61 which is an exposure table for exposure. In addition to that, since the suction table 61 is flat in shape with a sheet-shaped photographic paper, photographic paper adhesion transport belt 64, and suction table 61 all are in close contact with each other, it is possible to reduce pressure more in the course of exposure so that a sheet-shaped photographic paper, photographic paper adhesion transport belt 64, and suction table 61 are brought into close contact with each other to improve focusing of image formation. After exposure, the sheet-shaped photographic paper is transported by the photographic paper adhesion transport belt 64 to an automatic processing machine where it is processed. The photographic paper adhesion transport belt 64 is wound around belt roller of expandable suction table at feed-out means side 82, belt roller of suction table expandable to downstream transport section side 83, belt rollers of suction table 84 and 87, and damper rollers 85 and 86. As shown in FIGS. 5 and 6, when the suction table expandable to feed-out means side 62 and the suction table expandable to downstream transport section side 63 are extended and contracted, the damper rollers 85 and 86 move in the transport direction and absorb the extra length of the photographic paper adhesion transport belt 64.

On the transport stand holding means 9, there are provided suction table rotating section 91, suction table horizontal direction (front-rear direction) moving section 92 which holds the suction table rotating section 91 rotatably, suction table transport direction (longitudinal direction) moving section 93 which holds the suction table horizontal direction moving section 92, and holding base board 94 which holds the suction table transport direction moving section 93 movably in the transport direction. Transport stand 6 is rotated around an optical axis for exposure by the suction table rotating section 91. In the suction table rotating section 91, there is provided an unillustrated rotation position detection means with which the rotation position of the suction table 61 serving as an exposure table for exposure around an optical axis for exposure can be determined. The transport stand 6 is moved in the transport direction (longitudinal direction) by the suction table horizontal direction (front-rear direction) moving section 92. Further, the transport stand 6 is moved in the transport direction (longitudinal direction) by the suction table transport direction (longitudinal direction) moving section 93. Further, horizontal direction position detection sensor 95 is provided in the downward direction at the position protruded from the suction table transport direction moving section 93 on the left side at the bottom end of the suction table horizontal direction moving section 92. At a position corresponding to the positioning point in the horizontal direction for the suction table horizontal direction moving section 92 on the left-hand side of the suction table transport direction moving section 93, there is provided horizontal direction position detection mark 96 which is detected by the horizontal direction position detection sensor 95 to determine the position of the suction table horizontal direction moving section 92, in the horizontal direction. Further, transport direction position detection sensor 97 is provided in the downward direction at the position protruded from holding base plate 94 on the front side at the bottom end of the suction table transport direction moving section 93. At a position corresponding to the positioning point in the transport direction for the suction table transport direction moving section 93 on the front side of the holding base plate 94, there is provided transport direction position detection mark 98 which is detected by the transport direction position detection sensor 97 to determine the position of the suction table transport direction moving section 93, in the transport direction.

Next, there will be given an explanation along a transport path for photographic paper in photographic printing apparatus main body B shown in FIG. 5. Many roll magazines R can be set on roll magazine holder RS. Each of these roll magazines houses a roll-shaped photographic paper. Feed-out means 7 takes a photographic paper out of roll magazine R which is set in the roll magazine holder, and feeds it into photographic printing apparatus main body B. In the feed-out means 7, there is provided cutting means C. Transport stand 6 receives a sheet-shaped photographic paper cut by the cutting means C and fed out by the feed-out means 7, then causes it to be exposed at an exposure position, and transports it to downstream transport section T. The downstream transport section T receives the sheet-shaped photographic paper from the transport stand 6, and transports it to automatic processing machine AP which processes the transported sheet-shaped photographic paper.

Feed-out means 7 is provided with a pair of rollers 71 and with a pair of rollers 72 which are located at the back of the paired rollers 71. Each of the paired rollers 71 in the feed-out means 7 is a rubber roller wherein carbon black transformed elastically is dispersed and each roller is in pressure contact with the other roller and elastic deformation caused by the pressure contact prevents light from leaking through the rollers. The paired rollers 71 are further in pressure contact with light-shielding wall 79, and elastic deformation caused by the pressure contact equally prevents light from leaking through a boundary between the light-shielding wall 79 and the paired rollers 71. Therefore, the paired rollers 71 and the light-shielding wall 79 serve as a light-shielding means which shields the inside of the photographic printing apparatus main body B against light. The cutting means C is positioned in the feed-out means 7, namely, between the paired rollers 71 and paired rollers 72. The cutting means C cuts a photographic paper drawn out by the feed-out means 7 in its lateral direction (front-rear direction).

An arrangement for these many roll magazines R, feed-out means 7 and cutting means C is shown in FIG. 8. In roll magazine holder RS, six roll magazines R1–R6 each being a magazine for a roll-shaped photographic paper can be set. Each of the roll magazines R1–R6 is provided with each of paired rollers 711–716 and each of paired rollers 721–726 of feed-out means 7 which draw out a photographic paper from each of the roll magazines R1–R6 and feeds it into a photographic printing apparatus main body. In the feed-out means 7, there is provided cutting means C which cuts a photographic paper drawn out by the feed-out means 7 in its lateral direction. Each of the paired rollers 711–716 is provided with each of cutting means C1–C6. Transport stand 6 is also an accepting means which is subjected to deformation so that it may receive any photographic paper fed out by these many feed-out means 7, and transfers it to the downstream side of a transport path for photographic light-sensitive materials for printing.

All of the paired rollers 721–723 each representing a feed-out end of a feed-out means are located on the same plane perpendicular to the transport direction, and its feed-out direction is in parallel with the transport direction. Therefore, the paired rollers 721–723 are in the relation in the second embodiment for attaining the second object of the invention. Further, the paired rollers 722 and 725 each representing a feed-out end of a feed-out means are located on the same circumference of a circle whose center is a rotation axis for rotation of transport stand 6 which is a transport stand, and its feed-out direction points the center of rotation of the transport stand. Therefore, the paired rollers 722 and 725 are in the relation in the third embodiment for attaining the second object. The feed-out direction of each of the paired rollers 724–726 each representing a feed-out end of a feed-out means is in parallel with the front-rear direction (second direction) that is perpendicular to the transport direction, and its feed-out end is positioned on the same plane perpendicular to the front-rear direction (second direction). Therefore, the paired rollers 724–726 are in the relation in the fourth embodiment for attaining the second object.

Figure 9:
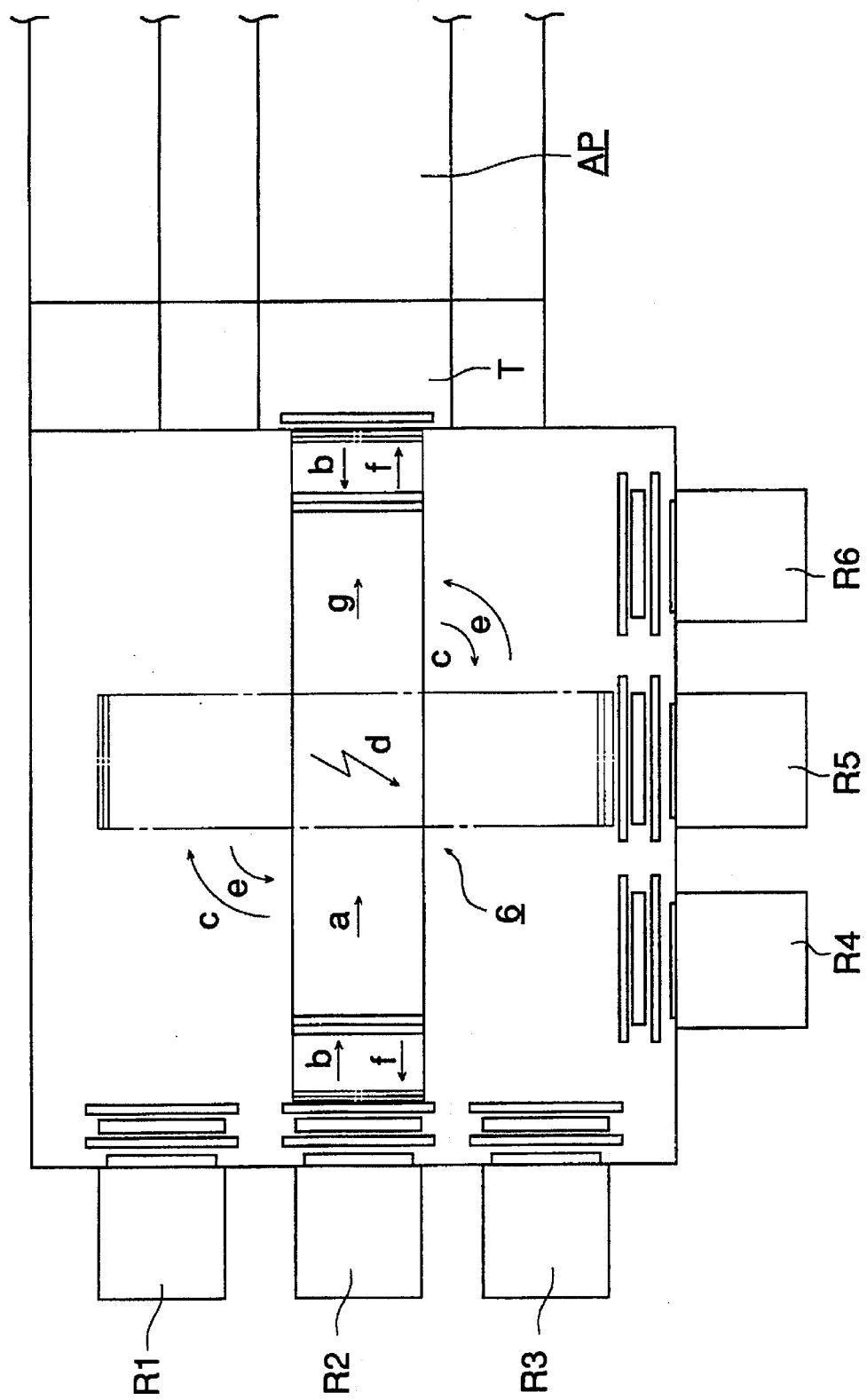
FIG. 9 is an illustration for operations of the photographic printing apparatus in Example 3.
Figure 10:
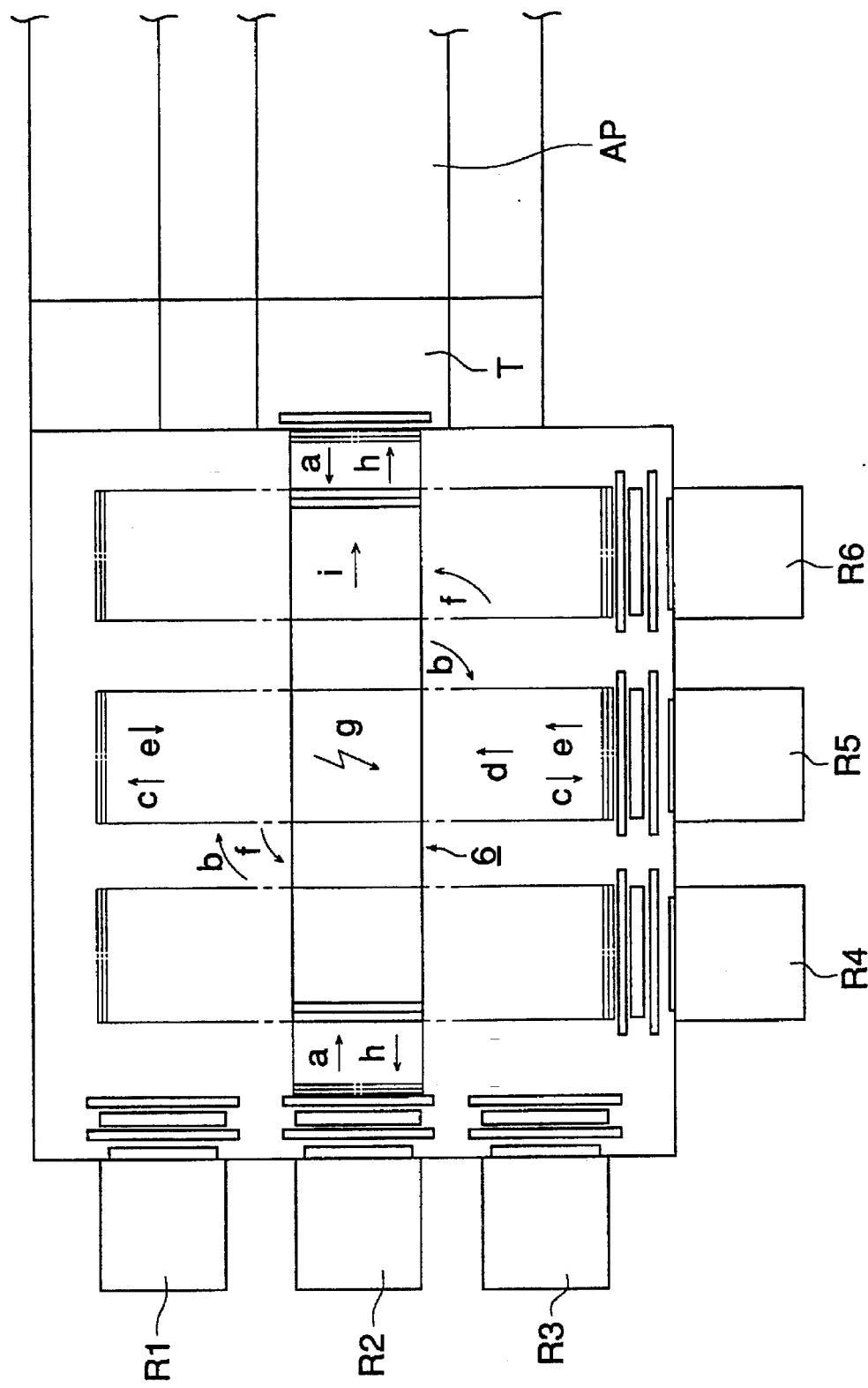
FIG. 10 is an illustration for operations of the photographic printing apparatus in Example 3.

Next, operations in the present example will be explained as follows, referring to FIGS. 8–10. An unillustrated control means in photographic printing apparatus main body B controls the operations as follows. Incidentally, the following symbols a, b, c, d, e, f, g, h and i correspond respectively to symbols a, b, c, d, e, f, g, h and i in FIGS. 8, 9 and 10.

When transport stand 6 receives a photographic paper from a pair of rollers 722 which represent a feed-out end of feed-out means 7 and transfers it to an exposure position and to a downstream transport section, operations are as follows. When printing in the ordinary direction of a photographic paper, the transport stand 6 is in the state wherein it can receive a sheet-shaped photographic paper from feed-out means with suction table expandable to feed-out means side 62 and suction table expandable to downstream transport section side 63 of transport stand 6 which are in the state wherein they are extended, and the photographic paper is transported under the condition that the sheet-shaped photographic paper can be transferred from the transport stand 6 to the downstream transport section T, and exposure is performed. Therefore, it is preferable that a roll magazine for a photographic paper whose size is most frequently used is placed at the position R2 through which a photographic paper can flow straight. When a sheet-shaped photographic paper is subjected to exposure in the direction perpendicular to the ordinary direction, procedures are as follows as shown in FIG. 9.

a. Transport stand 6 receives, while it is in the transport direction, a sheet-shaped photographic paper from feed-out means 7 under the condition that suction table expandable to feed-out means side 62 and suction table expandable to downstream transport section side 63 of transport stand 6 are extended.

b. The suction table expandable to feed-out means side 62 and suction table expandable to downstream transport section side 63 of transport stand 6 are contracted.

c. Suction table 61 of the transport stand 6 is rotated to be positioned.
d. Exposure is conducted.
e. The suction table 61 of the transport stand 6 is rotated to be directed to the original transport direction.
f. The suction table expandable to feed-out means side 62 and suction table expandable to downstream transport section side 63 of transport stand 6 are extended.
g. A sheet-shaped photographic paper is transferred to downstream transport section T from the transport stand 6.

When transport stand 6 receives a photographic paper from a pair of rollers 721 or 723 which represent a feed-out end of feed-out means 7 and transfers it to an exposure position and to a downstream transport section, operations are as follows. When a photographic paper is subjected to exposure in the ordinary direction, procedures are as follows as shown in FIG. 8.

a. The suction table expandable to feed-out means side 62 and suction table expandable to downstream transport section side 63 of transport stand 6 are contracted.
b. Suction table 61 of the transport stand 6 is moved by suction table horizontal direction (front-rear direction) moving section 92 to be positioned in the horizontal direction (front-rear direction).
c. The suction table expandable to feed-out means side 62 and suction table expandable to downstream transport section side 63 of transport stand 6 are extended.
d. The transport stand 6 receives, while it is in the feed-out direction, a sheet-shaped photographic paper from feed-out means 7.
e. The suction table expandable to feed-out means side 62 and suction table expandable to downstream transport section side 63 of transport stand 6 are contracted.
f. Suction table 61 of the transport stand 6 is moved by suction table horizontal direction (front-rear direction) moving section 92 to be positioned at the exposure position in the horizontal direction (front-rear direction).
g. Exposure is conducted.
h. The suction table expandable to feed-out means side 62 and suction table expandable to downstream transport section side 63 of transport stand 6 are extended.
i. A sheet-shaped photographic paper is transferred to downstream transport section T from the transport stand 6.

When exposing a sheet-shaped photographic paper in the direction perpendicular to the ordinary one, a procedure of "Suction table 61 of transport stand 6 is rotated to be positioned." is added before "g. Exposure is conducted." and a procedure of "Suction table 61 of transport stand 6 is rotated to be returned to the original transport direction." is added after "g. Exposure is conducted."

When transport stand 6 receives a photographic paper from a pair of rollers 725 representing a feed-out end of feed-out means 7 and transfers it to an exposure position and to a downstream transport section, operations are as follows. When a photographic paper is subjected to exposure in the ordinary direction, procedures are as follows as shown in FIG. 10.

a. The suction table expandable to feed-out means side 62 and suction table expandable to downstream transport section side 63 of transport stand 6 are contracted.
b. Suction table 61 of the transport stand 6 is rotated to be positioned.
c. The suction table expandable to feed-out means side 62 and suction table expandable to downstream transport section side 63 of transport stand 6 are extended.
d. The transport stand 6 receives a sheet-shaped photographic paper from feed-out means 7.
e. The suction table expandable to feed-out means side 62 and suction table expandable to downstream transport section side 63 of transport stand 6 are contracted.
f. Suction table 61 of the transport stand 6 is rotated to be returned to the original transport direction.
g. Exposure is conducted.
h. The suction table expandable to feed-out means side 62 and suction table expandable to downstream transport section side 63 of transport stand 6 are extended.
i. A sheet-shaped photographic paper is transferred to downstream transport section T from the transport stand 6.

When exposing a sheet-shaped photographic paper in the direction perpendicular to the ordinary one, the sequence of procedures of "f. Suction table 61 of the transport stand 6 is rotated to be returned to the original transport direction." and "g. Exposure is conducted." is reversed.

When transport stand 6 receives a photographic paper of roll magazine R4 or R6, namely when it receives a photographic paper from a pair of rollers 724 or 726 representing a feed-out end of feed-out means 7 and transfers it to an exposure position and to a downstream transport section, and when exposing the photographic paper in the ordinary direction, a procedure of "suction table 61 of transport stand 6 is moved by suction table transport direction (longitudinal direction) moving section 93 in the transport direction (longitudinal direction) to be positioned" is added before "c. The suction table expandable to feed-out means side 62 and suction table expandable to downstream transport section side 63 of transport stand 6 are extended", and a procedure of "suction table 61 of transport stand 6 is moved by suction table transport direction (longitudinal direction) moving section 93 in the transport direction (longitudinal direction) to be returned to the original position" is added before "f. Suction table 61 of the transport stand 6 is rotated to be returned to the original transport direction". Further, when exposing a sheet-shaped photographic paper in the direction perpendicular to the ordinary one, the sequence of procedures "f. Suction table 61 of the transport stand 6 is rotated to be returned to the original transport direction" and "g. Exposure is conducted" is reversed.

EXAMPLE 4

Figure 11:
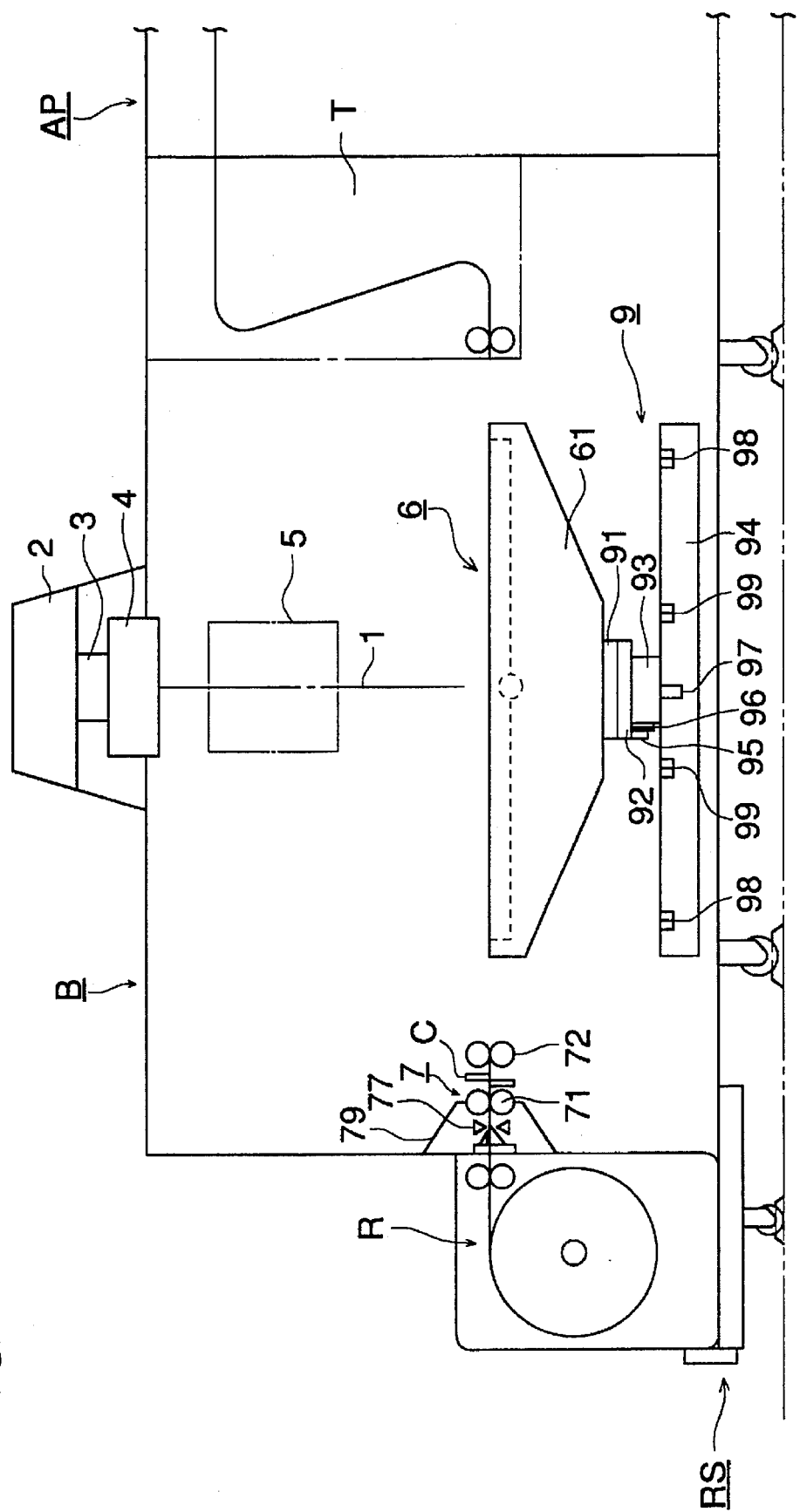
FIG. 11 is a schematic structure diagram of a photographic printing apparatus in Example 4.

FIG. 11 is a schematic structure diagram showing schematic structure of roll magazine holder RS and photographic printing apparatus main body B both of a photographic printing apparatus of the present example and showing connection of them with automatic processing machine AP.

First, there will be given an explanation along an optical path for exposure in photographic printing apparatus main body B shown in FIG. 11. An optical axis for exposure 1 in the photographic printing apparatus main body B is perpendicular. Light from a light source of lamp house 2 illuminates, through diffusion box 3, a color film held in negative carrier 4. Zoom lens 5 housing therein a diaphragm and a shutter forms images on the color film held on the negative carrier 4 on a sheet-shaped photographic paper. At the lower portion of the exposure optical path of the zoom lens 5, there is positioned transport stand 6 which holds photographic paper P at the focusing position of the zoom lens 5.

Figure 13:
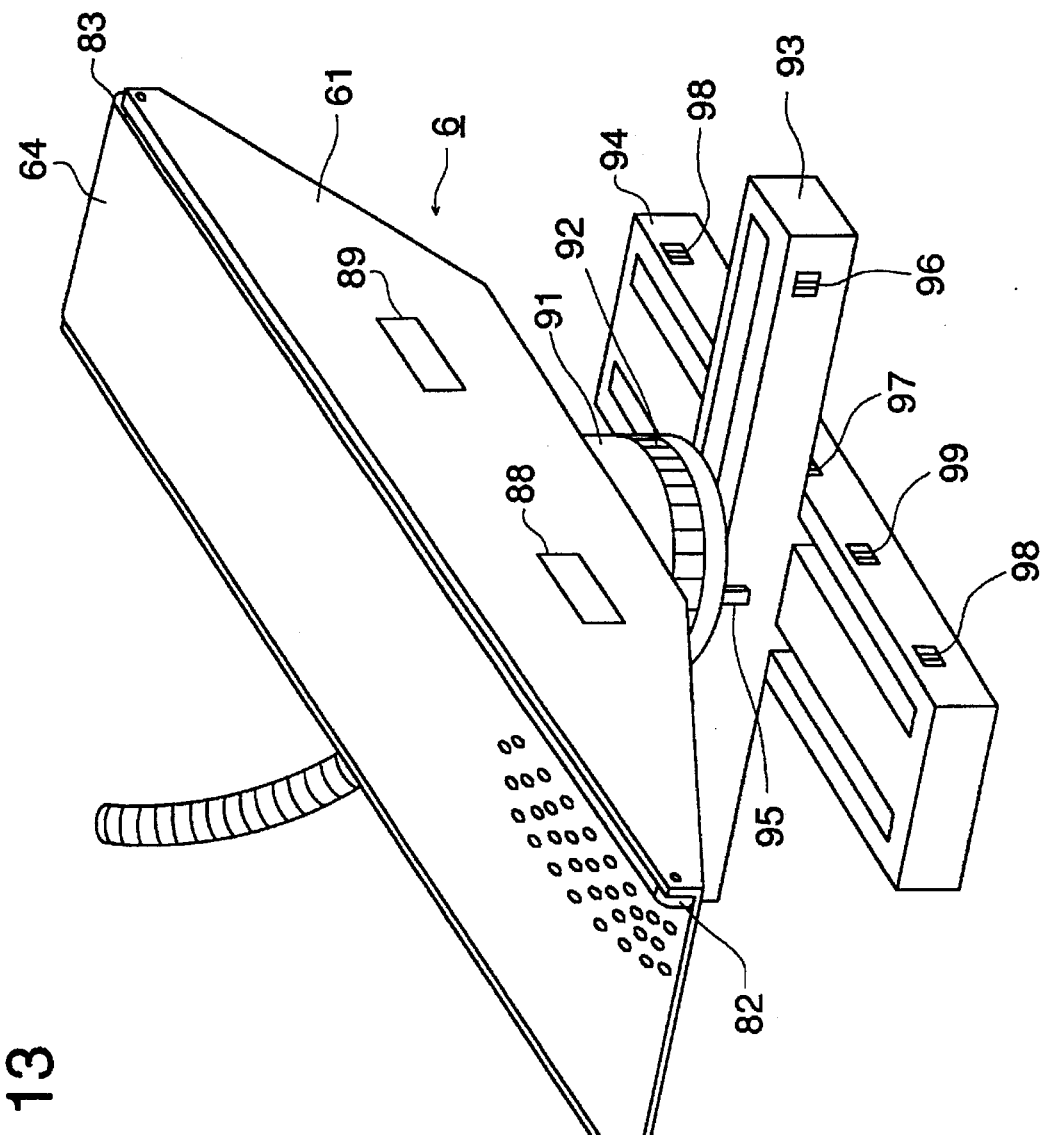
FIG. 13 is a perspective view of a transport stand in the photographic printing apparatus in Example 4.

On the transport stand 6, there are provided suction table 61 and transport stand holding means 9. A top face of the suction table 61 is a highly accurate plane. As shown in FIG. 13, the suction hose 65 is for creating the decompressed state on the suction table 61 by means of suction pump 66, The photographic paper adhesion transport belt 64 transports a sheet-shaped photographic paper while attracting it under the decompressed condition through the suction table 61. By means of an unillustrated photographic paper position detection means, it is possible to position a photographic paper at an exposure position on the suction table 61 which is an exposure table for exposure. In addition to that, since the suction table 61 is flat in shape with a sheet-shaped photographic paper, photographic paper adhesion transport belt 64, and suction table 61 all are in close contact with each other, it is possible to reduce pressure more in the course of exposure so that a sheet-shaped photographic paper, photographic paper adhesion transport belt 64, and suction table 61 are brought into close contact with each other to improve focusing of image formation. After exposure, the sheet-shaped photographic paper is transported by the photographic paper adhesion transport belt 64 to an automatic processing machine where it is processed. The photographic paper adhesion transport belt 64 is wound around plural belt rollers of the suction table 61.

Next, relationship of suction table 61 of transport stand 6, photographic paper adhesion transport belt 64 and a sheet-shaped photographic paper will be explained as follows, referring to FIG. 21 (A). At a position which is almost the center on the side of the suction table 61, there are provided suction force adjusting holes 88 and 89 which are opened during non-exposure time and are closed during exposure time for further reducing pressure during the exposure time. A top face of the suction table 61 is formed to be a flat surface for improving the flatness of the sheet-shaped photographic paper and for improving focusing of formed images by further reducing pressure during exposure time and by making the sheet-shaped photographic paper, photographic paper adhesion transport belt 64 and suction table 61 to be brought into close contact with each other. The photographic paper adhesion transport belt 64 is wound around plural belt rollers 82 and 83 of the suction table 61. On the photographic paper adhesion transport belt 64, there are provided almost circular belt suction holes 68 at prescribed pitch LB in the transport direction. On the suction table 61, there are provided suction table rectangular suction ports 67 each being rounded at its corners and elongated in the transport direction at prescribed pitch LS in the transport direction. Further, the belt suction holes 68 on the photographic paper adhesion transport belt 64 and the suction table suction ports 67 on the suction table 61 are positioned at the same lateral pitch. Due to the arrangement that five belt suction holes 68 are provided in prescribed longitudinal length L in the transport direction and 4 suction table suction ports 67 are provided in the same length, namely, due to the arrangement that the belt suction holes 68 and the suction table suction ports 67 are provided at the different pitch in the transport direction, a photographic paper can be sucked surely through the belt suction holes 68 when it is on the photographic paper adhesion transport belt 64, thus, the photographic paper can be sucked and transported stably, and the photographic paper adhesion transport belt 64 can surely be sucked through the suction table suction ports 67, thereby, the photographic paper adhesion transport belt 64 is prevented from being lifted from the suction table 61 especially in the case of exposure. Numbers 82, 89, 102, 117, 120, 127, 152, 165 and 203 shown in FIG. 21 (A) represent photographic paper widths (mm).

A photographic paper whose width is 82 mm or 89 mm is sucked by suction holes corresponding to two rows in the lateral direction from the center, a photographic paper whose width is 102 mm, 117 mm, 120 mm or 127 mm is sucked by suction holes corresponding to three rows in the lateral direction from the center, a photographic paper whose width is 152 mm, or 165 mm is sucked by suction holes corresponding to four rows in the lateral direction from the center, and a photographic paper whose width is 203 mm is sucked by suction holes corresponding to five rows in the lateral direction from the center. However, in the case of a photographic paper whose width is as small as 82 mm or 89 mm, the rate of suction ports which do not contribute to suction of a photographic paper is great, making it impossible to further reduce pressure, and it is difficult, in the case of a small-sized sheet-shaped photographic paper, to make the sheet-shaped photographic paper, the photographic paper adhesion transport belt 64 and the suction table 61 to come into close contact each other, and thereby to improve the flatness of the sheet-shaped photographic paper and focusing of formed images even when a powerful suction pump is used. Therefore, as shown in FIG. 21 (B), air-shielding plates 41 and 42 capable of being opened and closed which cover suction ports for two rows from each of both ends are provided so that, when the width of a photographic paper supplied is not more than 127 mm, the air-shielding plates 41 and 42 are closed to cover suction ports corresponding to two rows from each of both ends, and thereby the rate of suction ports which do not contribute to suction of a photographic paper is made small and the pressure can further be reduced even when a suction pump which is not so powerful is used. Due to the foregoing, even in the case of a small-sized photographic paper, it is possible to make a sheet-shaped photographic paper, photographic paper adhesion transport belt 64 and suction table 61 to come in close contact each other and to improve the flatness of the sheet-shaped photographic paper and thereby to improve focusing of formed images. For the purpose mentioned above, the air-shielding plates 41 and 42 are fixed respectively on rotary shafts 43 and 44, belt 45 is wound around the rotary shaft 43 and solenoid 47, gear train 48 is provided on the rotary shaft 44 so that the rotary shafts 43 and 44 rotate in the opposite direction each other, and belt 46 is wound around the gear train 48 provided on the rotary shaft 44 and the solenoid 47, thus, the air-shielding plates 41 and 42 are opened and closed when the solenoid 47 is rotated.

Figure 21:
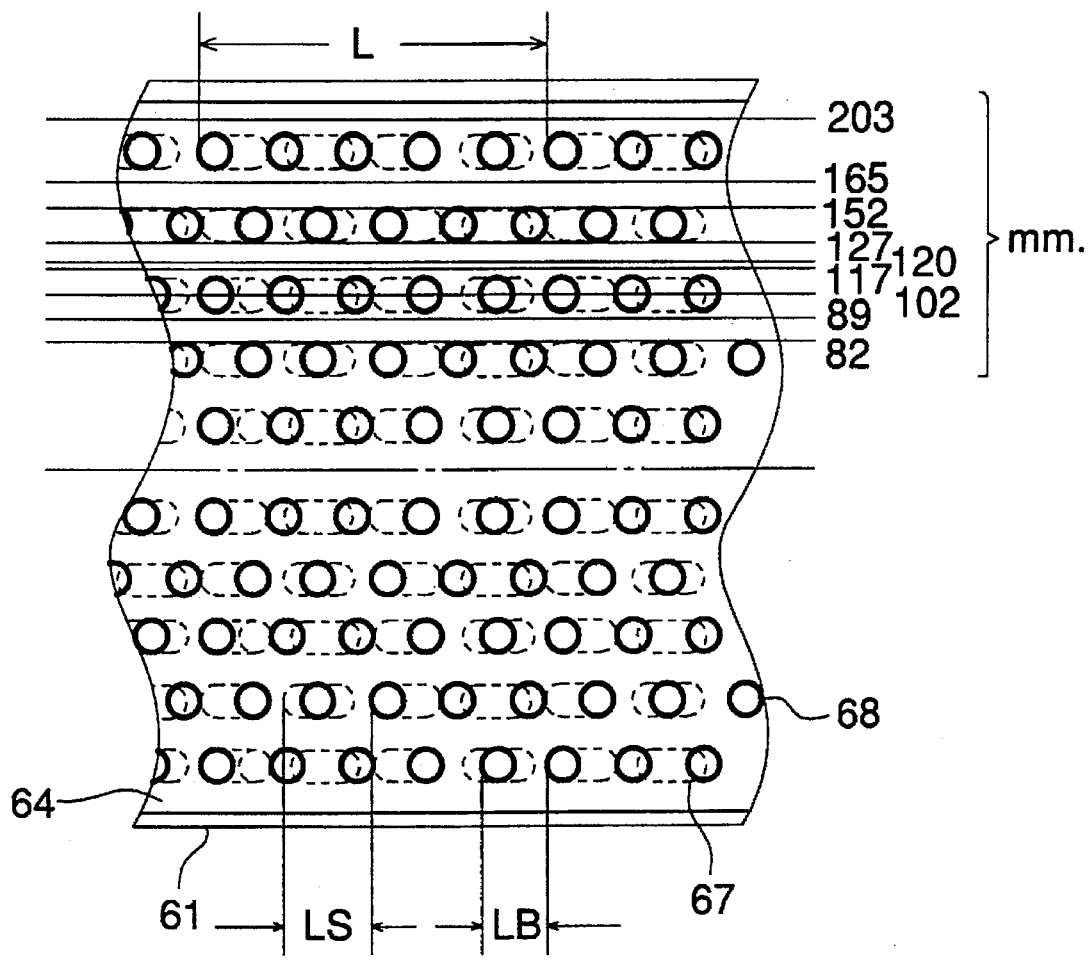
FIG. 21 (A) is a diagram showing relationship of the suction table, transport belt and photographic paper shown in FIG. 13.
Figure 21:
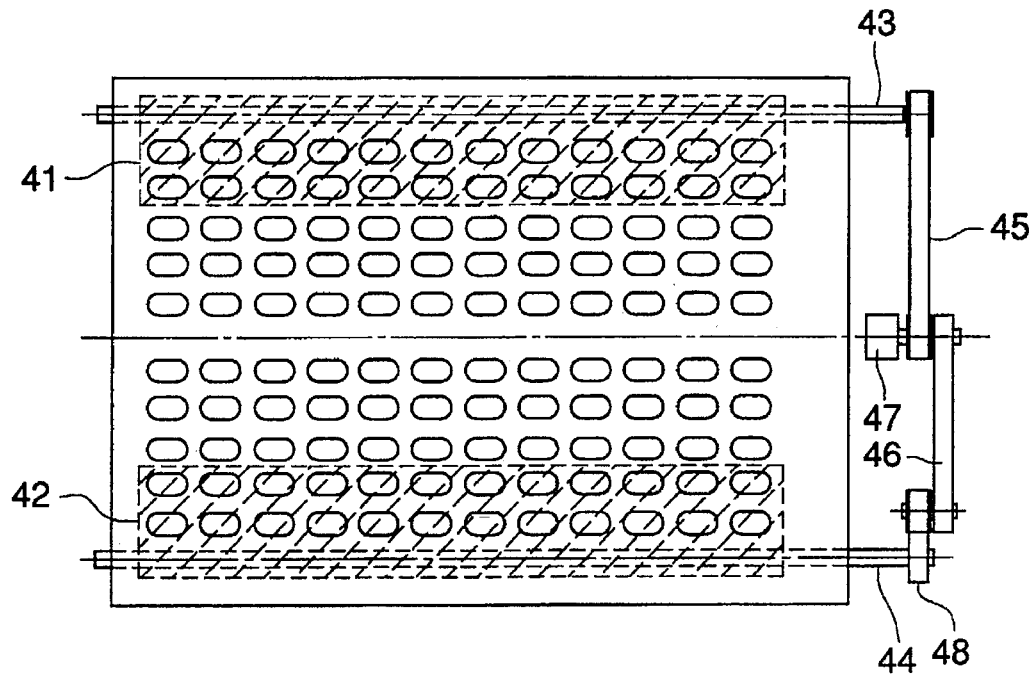
Figure 21:
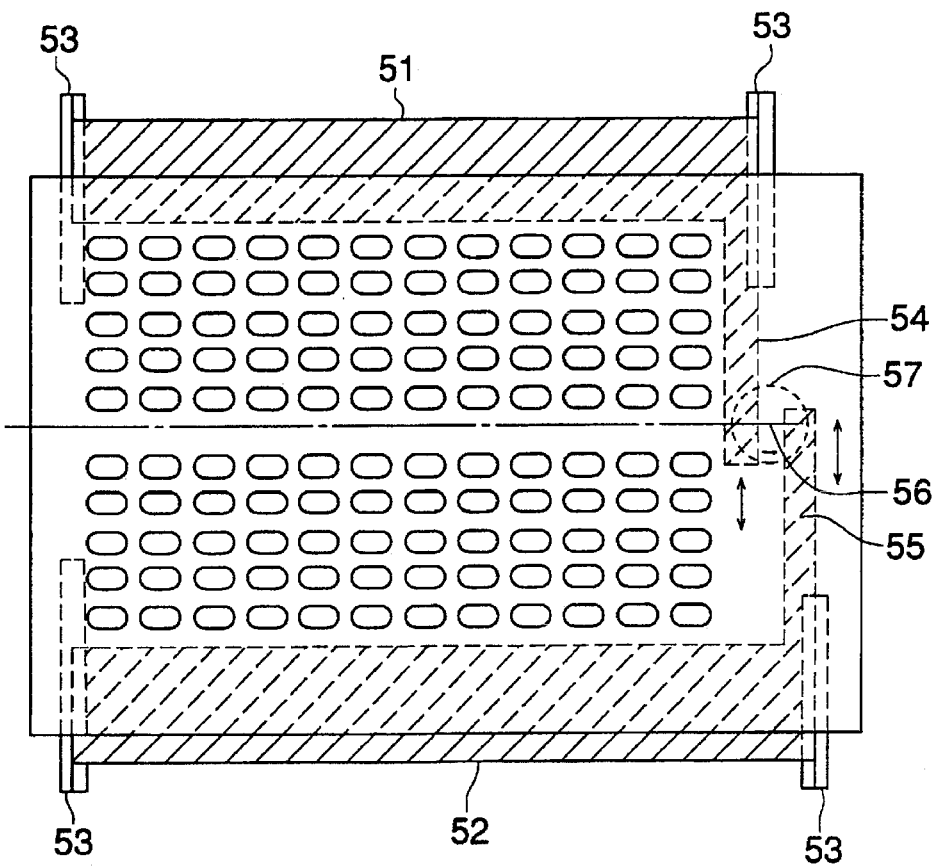

Incidentally, in another method replacing the aforementioned mechanism, air-shielding plate guides 53 are provided on both ends of each of the air-shielding plates 51 and 52 as shown in FIG. 21 (C), air-shielding racks 54 and 55 are provided respectively on the air-shielding plates 51 and 52, and motor 57 having pinion 56 which engages with the air-shielding plate racks 54 and 55 is provided, thus, the air-shielding plates 51 and 52 are opened and closed when the motor 57 rotates. In the figure, when the motor 57 rotates clockwise, the air-shielding plates 51 and 52 are opened, while when the motor rotates counterclockwise, the air-shielding plates 51 and 52 are closed. In this case, when the width of a photographic paper supplied is not more than 89 mm, the air-shielding plates 41 and 42 are closed to cover suction ports corresponding to three rows from each of both ends, when the width of a photographic paper supplied is not less than 102 mm and not more than 127 mm, the air-shielding plates 41 and 42 are closed to cover suction ports corresponding to two rows from each of both ends, and when the width of a photographic paper supplied is not less than 152 mm and not more than 165 mm, the air-shielding plates 41 and 42 are closed to cover suction ports corresponding to one row from each of both ends, thus, the rate of suction ports which do not contribute to suction of a photographic paper is made small depending on the width of a photographic paper, so that the pressure can further be reduced even when a suction pump that is not so powerful is used, and thereby a sheet-shaped photographic paper, photographic paper adhesion transport belt 64 and suction table 61 can be brought in close contact with each other to improve the flatness of the sheet-shaped photographic paper and thereby to improve focusing of formed images.

By opening suction force adjusting ports 88 and 89 in a way to get pressure for suction which is not more than a prescribed pressure level when a sheet-shaped photographic paper is sucked and transported by photographic paper adhesion transport belt 64 under the state the pressure is reduced through suction table 61, it is possible to prevent that the photographic paper adhesion transport belt 64 comes in close contact with the suction table 61, and thereby, the driving force for moving the photographic paper adhesion transport belt 64 while keeping the sheet-shaped photographic paper at a prescribed position on the photographic paper adhesion transport belt 64 can be small, and an amount of deformation of the photographic paper adhesion transport belt 64 caused by a convex roller that is a shape of belt rollers 82 and 83 is small, resulting in an extended life of the photographic paper adhesion transport belt 64.

On the transport stand holding means 9. there are provided suction table rotating section 91, suction table horizontal direction (front-rear direction) moving section 92 which holds the suction table rotating section 91 rotatably, suction table transport direction (longitudinal direction) moving section 93 which holds the suction table horizontal direction moving section 92, and holding base board 94 which holds the suction table transport direction moving section 93 movably in the transport direction. Transport stand 6 is rotated around an optical axis for exposure by the suction table rotating section 91. In the suction table rotating section 91, there is provided an unillustrated rotation position detection means with which the rotation position of the suction table 61 serving as an exposure table for exposure around an optical axis for exposure can be determined. The transport stand 6 is moved in the transport direction (longitudinal direction) by the suction table horizontal direction (front-rear direction) moving section 92. Further, the transport stand 6 is moved in the transport direction (longitudinal direction) by the suction table transport direction (longitudinal direction) moving section 93. Further, horizontal direction position detection sensor 95 is provided in the downward direction at the position protruded from the suction table transport direction moving section 93 on the left side at the bottom end of the suction table horizontal direction moving section 92. At a position corresponding to the positioning point in the horizontal direction for the suction table horizontal direction moving section 92 on the left-hand side of the suction table transport direction moving section 93, there is provided horizontal direction position detection mark 96 which is detected by the horizontal direction position detection sensor 95 to determine the position of the suction table horizontal direction moving section 92 in the horizontal direction. Further, transport direction position detection sensor 97 is provided in the downward direction at the position protruded from holding base plate 94 on the front side at the bottom end of the suction table transport direction moving section 93. At a position corresponding to the positioning point in the transport direction for the suction table transport direction moving section 93 on the front side of the holding base plate 94, there is provided transport direction position detection mark 98 which is detected by the transport direction position detection sensor 97 to determine the position of the suction table transport direction moving section 93 in the transport direction.

Figure 12:
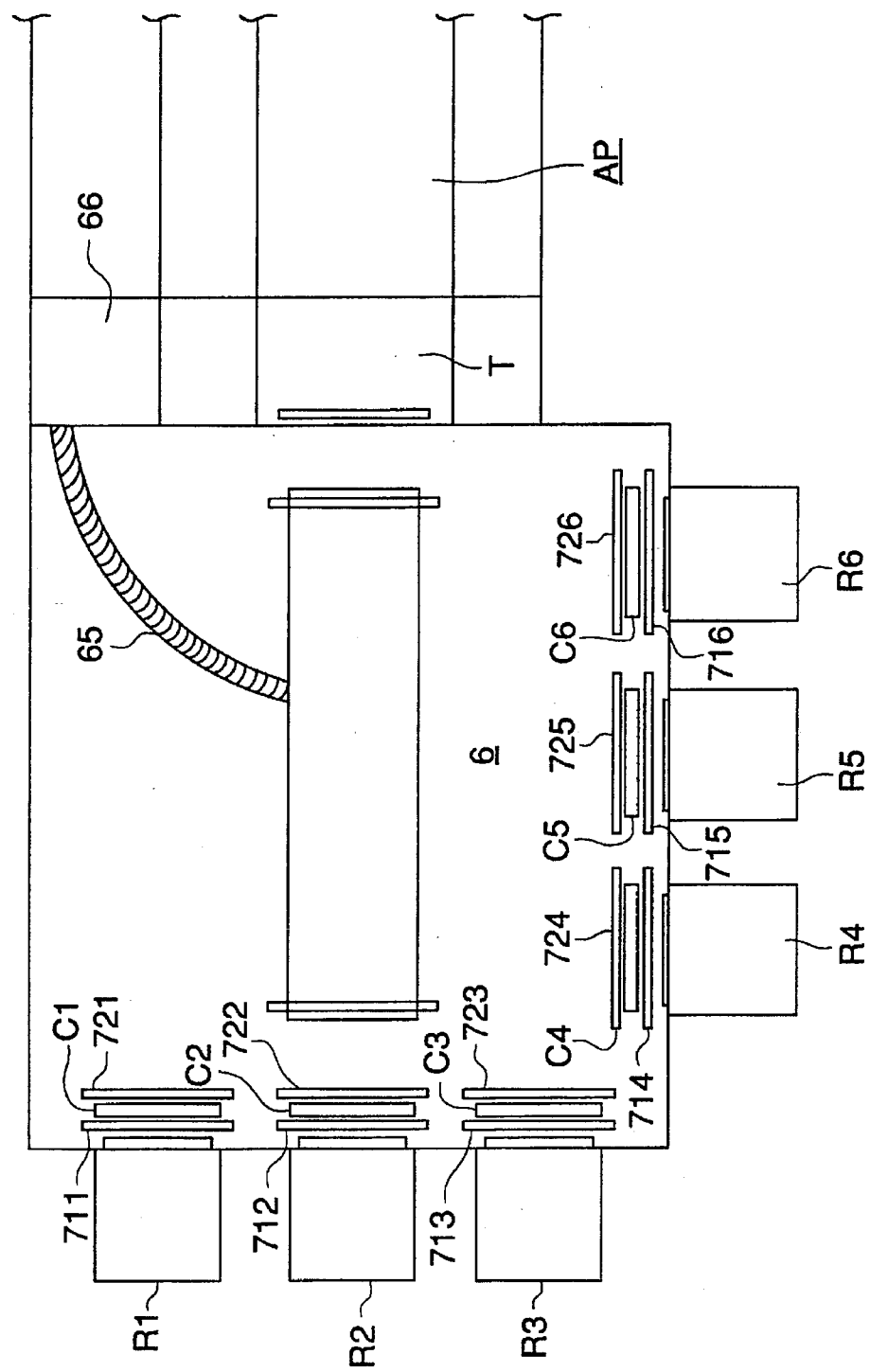
FIG. 12 is a plan view of the photographic printing apparatus in Example 4.

Next, there will be given an explanation along a transport path for photographic paper in photographic printing apparatus main body B shown in FIG. 12. Many roll magazines R can be set on roll magazine holder RS. Each of these roll magazines houses a roll-shaped photographic paper. Feed-out means 7 takes a photographic paper out of roll magazine R which is set in the roll magazine holder, and feeds it into photographic printing apparatus main body B. In the feed-out means 7, there is provided cutting means C. Transport stand 6 receives a sheet-shaped photographic paper cut by the cutting means C and fed out by the feed-out means 7, then causes it to be exposed at an exposure position, and transports it to downstream transport section T. The downstream transport section T receives the sheet-shaped photographic paper from the transport stand 6, and transports it to automatic processing machine AP which processes the transported sheet-shaped photographic paper.

Feed-out means 7 is provided with a pair of rollers 71 and with a pair of rollers 72 which are located at the back of the paired rollers 71. Each of the paired rollers 71 in the feed-out means 7 is a rubber roller wherein carbon black transformed elastically is dispersed and each roller is in pressure contact with the other roller and elastic deformation caused by the pressure contact prevents light from leaking through the rollers. The paired rollers 71 are further in pressure contact with light-shielding wall 79, and elastic deformation caused by the pressure contact equally prevents light from leaking through a boundary between the light-shielding wall 79 and the paired rollers 71. Therefore, the paired rollers 71 and the light-shielding wall 79 serve as a light-shielding means which shields the inside of the photographic printing apparatus main body B against light. In addition, as shown in FIG. 12, each of cutting means C1–C6 is located between each of paired rollers 711–716 and each of paired rollers 721–726. The cutting means C is one which cuts a photographic paper drawn out by feed-out means 7 in its lateral direction (front-rear direction). Six roll magazines R1–R6 each being a magazine for a roll-shaped photographic paper can be set on roll magazine holder RS. Each of the roll magazines R1–R6 is provided with each of pairs 711/721–716/726 of feed-out means 7 each drawing out a photographic paper from each of roll magazines R1–R6 and feeding it into a photographic printing apparatus main body. Transport stand 6 moves so that it can receive any of photographic papers fed out from many feed-out means 7, and it also serves as an exposure stand for exposure that transfers to the downstream side of a transport path for photographic light-sensitive materials for printing.

All of the paired rollers 721–723 each representing a feed-out end of a feed-out means are located on the same plane perpendicular to the transport direction, and its feed-out direction is in parallel with the transport direction. Further, the paired rollers 722 and 725 each representing a feed-out end of a feed-out means are located on the same circumference of a circle whose center is a rotation axis for rotation of transport stand 6 which is a transport stand, and its feed-out direction points to the center of rotation of the transport stand. The feed-out direction of each of the paired rollers 724–726 each representing a feed-out end of a feed-out means is in parallel with the front-rear direction (second direction) that is perpendicular to the transport direction, and its feed-out end is positioned on the same plane perpendicular to the front-rear direction (second direction).

Figure 14:
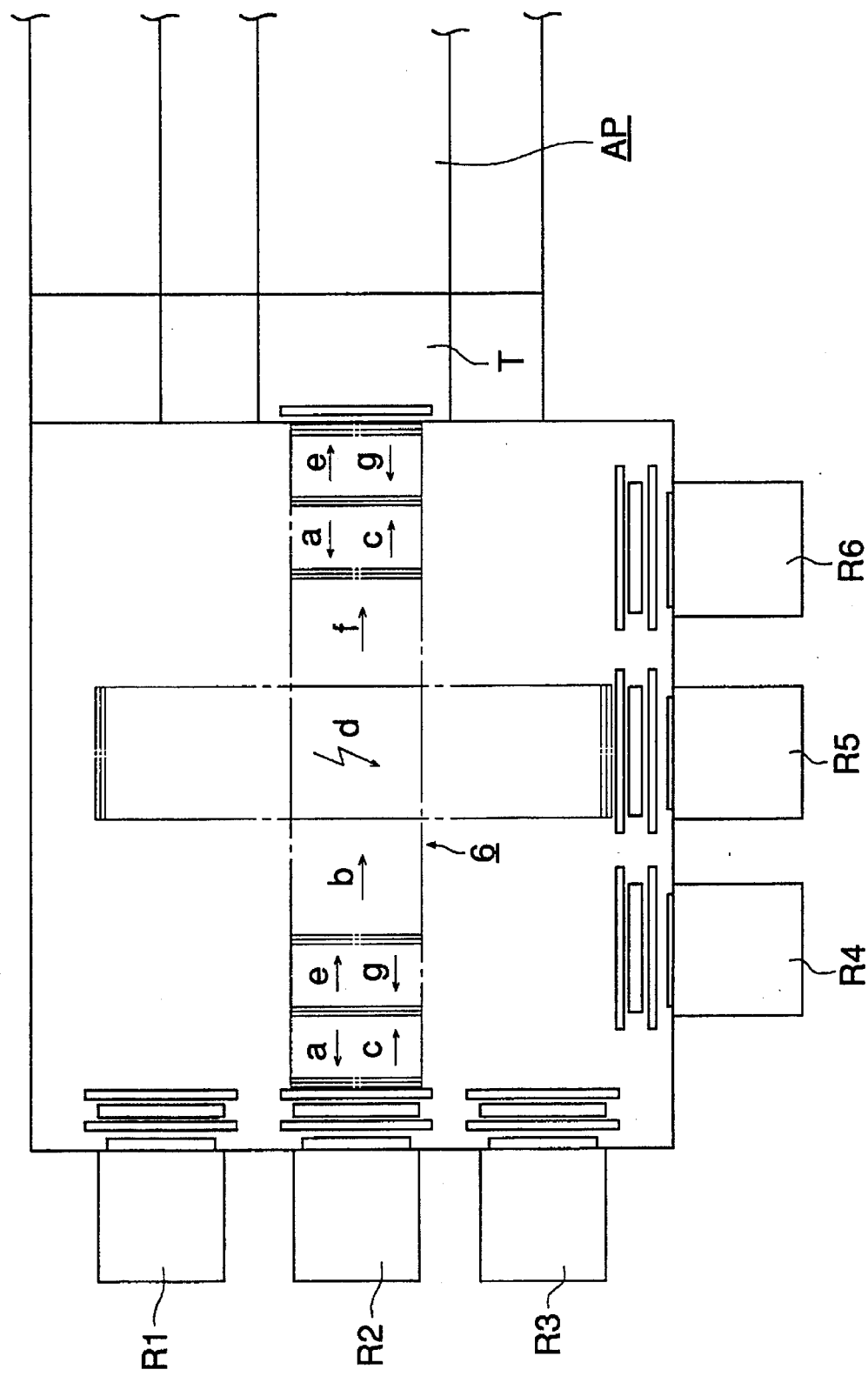
FIG. 14 is an illustration for operations of the photographic printing apparatus in Example 4.

Next, operations in the present example will be explained as follows, referring to FIG. 14. A control means in photographic printing apparatus main body B controls the operations as follows.

Figure 15:
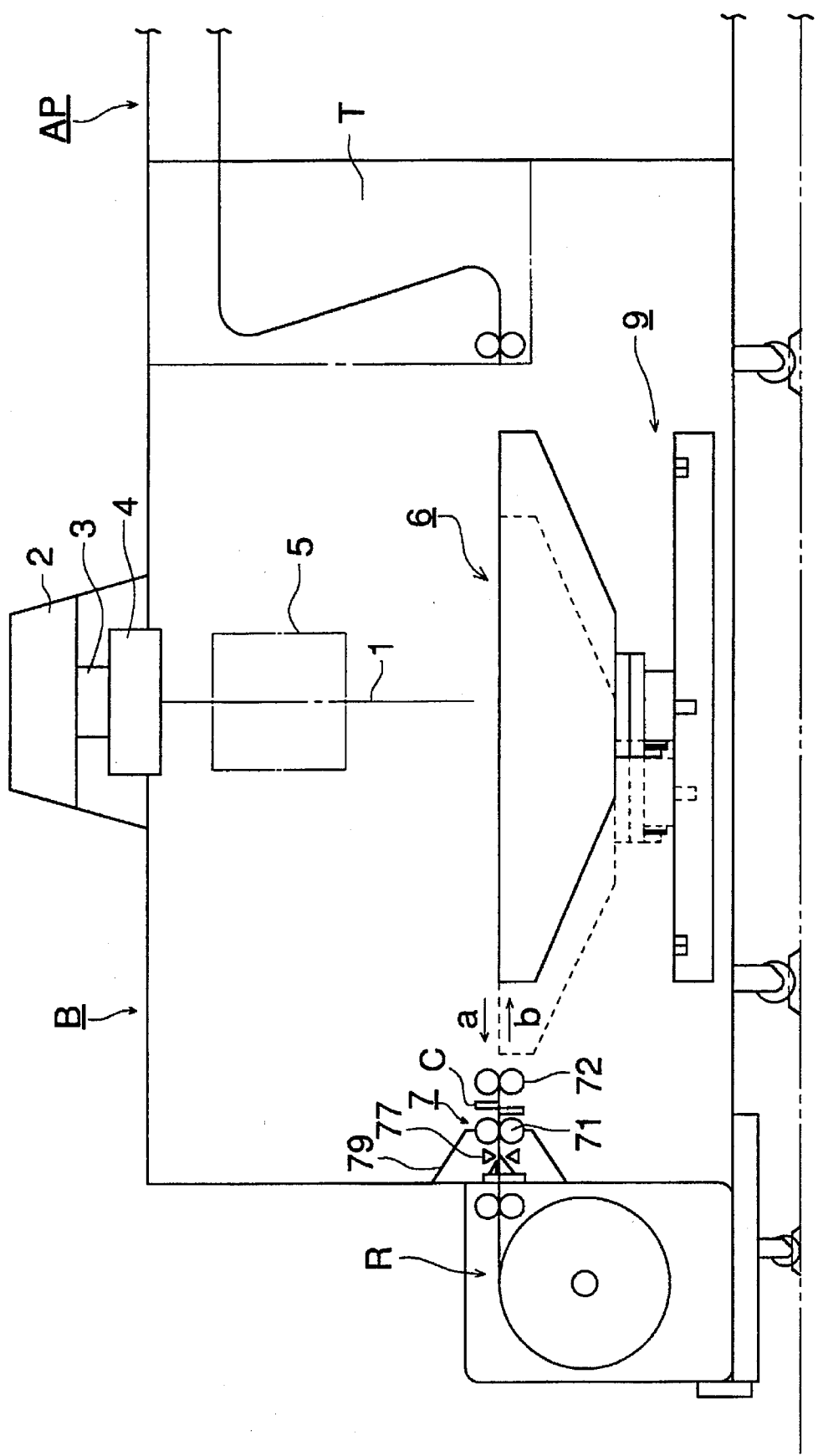
FIG. 15 is an illustration for operations of the transport stand in the photographic printing apparatus in Example 4.
Figure 16:
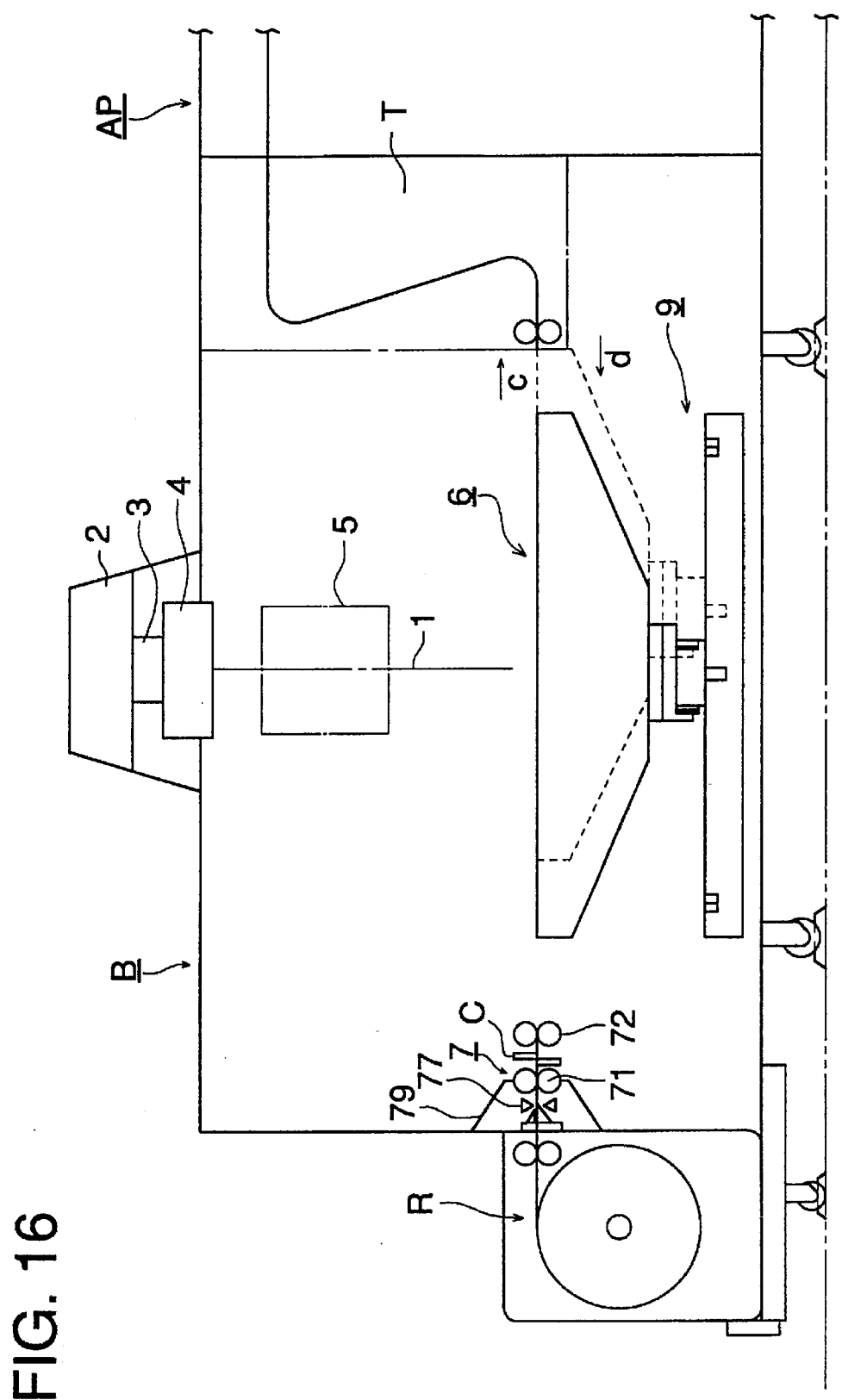
FIG. 16 is an illustration for operations of a transport stand in a photographic printing apparatus in Example 5.

When transport stand 6 receives a photographic paper from a pair of rollers 722 which represent a feed-out end of feed-out means 7 and transfers it to an exposure position and to a downstream transport section, operations are as follows. When printing in the ordinary direction of a photographic paper, procedures are as follows.

a. As shown in FIG. 15, exposure stand 6 is moved so that it is made to be in the state wherein it can receive a sheet-shaped photographic paper from feed-out means 7 under the condition that the exposure stand is in the direction of feeding-out of the feed-out means 7.
b. The exposure stand 6 receives a sheet-shaped photographic paper from the feed-out means 7, and the sheet-shaped photographic paper is positioned at the center of the exposure stand 6.
c. The exposure stand 6 is moved to an exposure position and is positioned thereto so that the center of the exposure stand may be positioned at an optical axis for exposure.
d. Exposure is conducted.
e. As shown in FIG. 16, the exposure stand 6 is moved so that it is made to be in the state wherein it can transfer the sheet-shaped photographic paper from exposure stand 6 to downstream transport section T under the condition that the exposure stand is in the transport direction.
f. The sheet-shaped photographic paper is transferred from the exposure stand 6 to the downstream transport section T.
g. The exposure stand 6 is moved to be returned to its original position.

When exposing a photographic paper in the direction perpendicular to the ordinary one, a procedure of "Exposure stand 6 is rotated to be positioned." is added before "d. Exposure is conducted." and a procedure of "Suction table 61 of transport stand 6 is rotated to be returned to the original transport direction." is added after "g. Exposure is conducted."

Depending upon a position of feed-out means 7 (depending upon which the feed-out means takes among 711–716), contents of "a. Exposure stand 6 is moved so that it is made to be in the state wherein it can receive a sheet-shaped photographic paper from feed-out means 7." and "c. The exposure stand 6 is moved to an exposure position and is positioned thereto so that the center of the exposure stand may be positioned at an optical axis for exposure." are naturally different.

EXAMPLE 5

Figure 17:
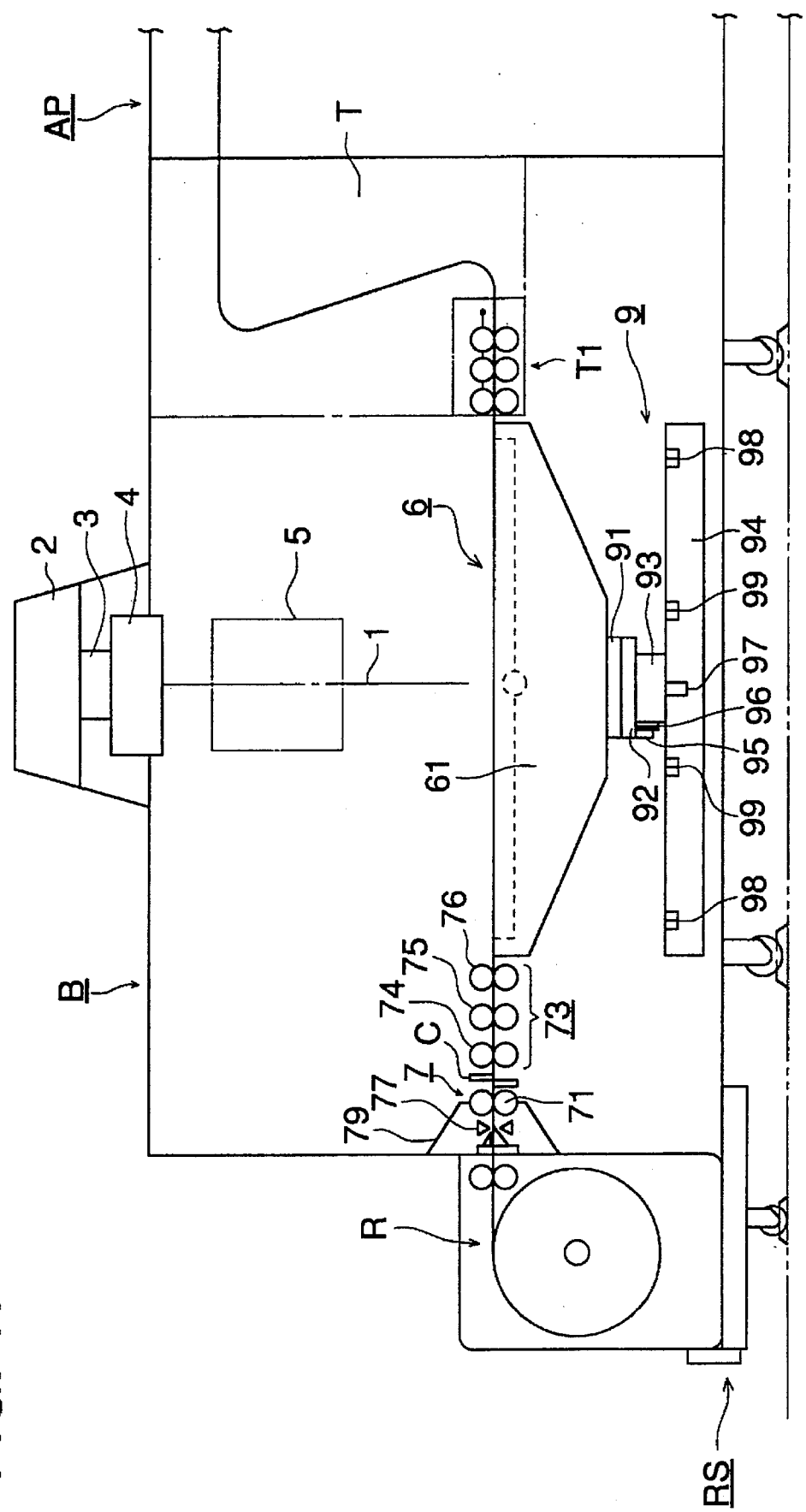
FIG. 17 is a schematic structure diagram of the photographic printing apparatus in Example 5.

FIG. 17 is a schematic structure diagram showing schematic structure of roll magazine holder RS and photographic printing apparatus main body B both of a photographic printing apparatus of the present example and showing connection of them with automatic processing machine AP.

First, there will be given an explanation along an optical path for exposure in photographic printing apparatus main body B shown in FIGS. 17. An optical axis for exposure 1 in the photographic printing apparatus main body B is perpendicular. Light from a light source of lamp house 2 illuminates, through diffusion box 3, a color film held in negative carrier 4. Zoom lens 5 housing therein a diaphragm and a shutter forms images on the color film held on the negative carrier 4 on a sheet-shaped photographic paper. At the lower portion of the exposure optical path of the zoom lens 5, there is positioned transport stand 6 which holds photographic paper P at the focusing position of the zoom lens 5.

On the transport stand 6, there are provided suction table 61 and transport stand holding means 9. A top face of the suction table 61 is a highly accurate plane. The suction hose 65 is for creating the decompressed state on the suction table 61 by means of suction pump 66. The photographic paper adhesion transport belt 64 transports a sheet-shaped photographic paper while attracting it under the decompressed condition through the suction table 61. By means of an unillustrated photographic paper position detection means, it is possible to position a photographic paper at an exposure position on the suction table 61 which is an exposure table for exposure. In addition to that, since the suction table 61 is flat in shape with a sheet-shaped photographic paper, photographic paper adhesion transport belt 62, and suction table 61 all are in close contact with each other, it is possible to reduce pressure more in the course of exposure so that a sheet-shaped photographic paper, photographic paper adhesion transport belt 62, and suction table 61 are brought into close contact with each other to improve focusing of image formation. After exposure, the sheet-shaped photographic paper is transported by the photographic paper adhesion transport belt 62 to an automatic processing machine where it is processed. The photographic paper adhesion transport belt 62 is wound around plural belt rollers of the suction table 61.

Transport stand holding means 9 is the same as that in Example 4.

Figure 19:
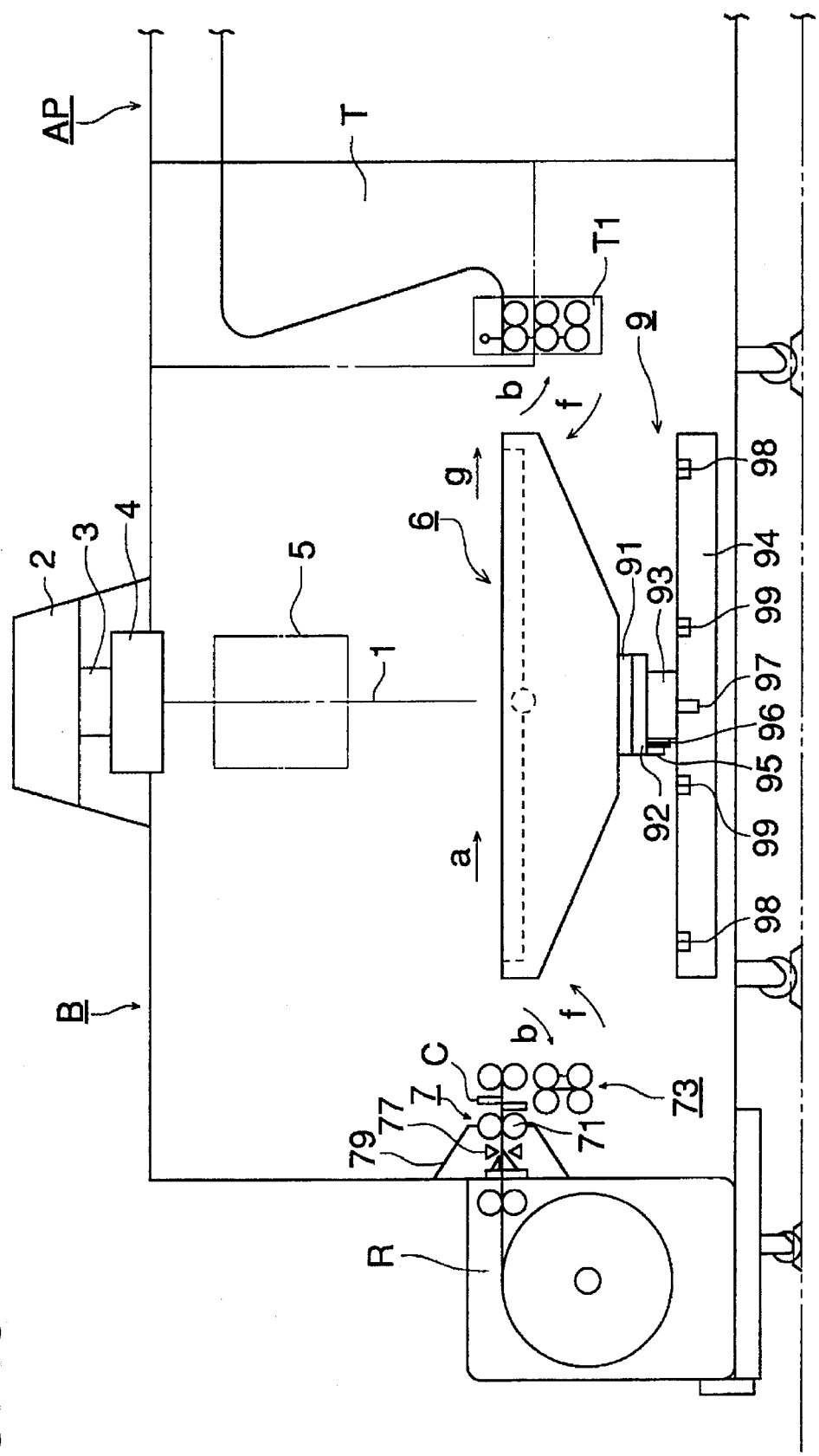
FIG. 19 is an illustration for operations of a feed-out retreating section and a downstream transport retreating section in the photographic printing apparatus in Example 5.

Next, there will be given an explanation along a transport path for photographic paper in photographic printing apparatus main body B shown in FIG. 17. Many roll magazines R can be set on roll magazine holder RS. Each of these roll magazines houses a roll-shaped photographic paper. Feed-out means 7 takes a photographic paper out of roll magazine R which is set in the roll magazine holder, and feeds it into photographic printing apparatus main body B. In the feed-out means 7, there is provided cutting means C. At the forefront of the feed-out means 7, there is provided feed-out evacuation section 73 that is composed of three pairs of rollers. This feed-out evacuation section 73 located on the side of the exposure stand of the feed-out means 7 can be evacuated as shown in FIG. 19. Transport stand 6 receives a sheet-shaped photographic paper cut by the cutting means C and fed out by the feed-out evacuation section 73 of feed-out means 7, then causes it to be exposed at an exposure position, and transports it to downstream transport section T. On the side of transport stand 6 of the downstream transport section T, there is provided downstream transport evacuation section T1 composed of three pairs of rollers. This downstream transport evacuation section T1 located on the side of the exposure stand of the downstream transport section T can be evacuated as shown in FIG. 19. Through the downstream transport evacuation section T1, the downstream transport section T receives the sheet-shaped photographic paper from the transport stand 6, and transports it to automatic processing machine AP which processes the transported sheet-shaped photographic paper.

Feed-out means 7 is provided with a pair of rollers 71 and with a pair of rollers 72 which are located at the back of the paired rollers 71. Each of the paired rollers 71 in the feed-out means 7 is a rubber roller wherein carbon black transformed elastically is dispersed, and each roller is in pressure contact with the other roller and elastic deformation caused by the pressure contact prevents light from leaking through the rollers. The paired rollers 71 are further in pressure contact with light-shielding wall 79, and elastic deformation caused by the pressure contact equally prevents light from leaking through a boundary between the light-shielding wall 79 and the paired rollers 71. Therefore, the paired rollers 71 and the light-shielding wall 79 serve as a light-shielding means which shields the inside of the photographic printing apparatus main body B against light. In addition, cutting means C1 is located between a pair of rollers and the feed-out evacuation section 73. The cutting means C is one which cuts a photographic paper drawn out by feed-out means 7 in its lateral direction (front-rear direction). Six roll magazines R1–R6 each being a magazine for a roll-shaped photographic paper can be set on roll magazine holder RS. Each of the roll magazines R1–R6 is provided with a pair of rollers and feed-out evacuation section 73 both of the feed-out means 7 drawing out a photographic paper from each of roll magazines R1–R6 and feeding it into a photographic printing apparatus main body. Transport stand 6 moves so that it can receive any of photographic papers fed out from many feed-out means 7, and it also serves as an exposure stand for exposure that transfers to the downstream side of a transport path for photographic light-sensitive materials for printing.

Figure 18:
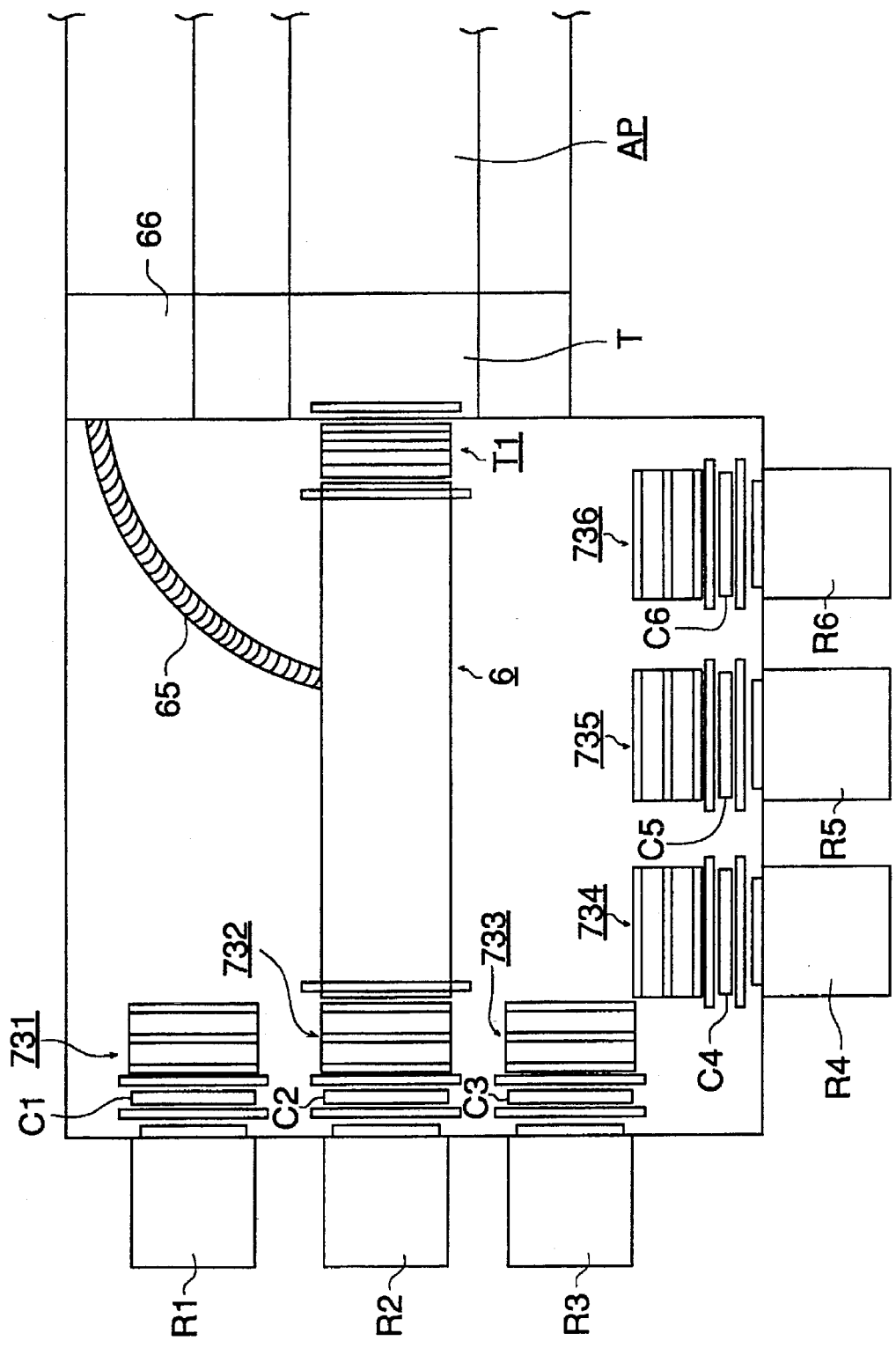
FIG. 18 is a plan view of the photographic printing apparatus in Example 5.

As shown in FIG. 18, all of the paired rollers 721–723 each representing a feed-out end of a feed-out means are located on the same plane perpendicular to the transport direction, and its feed-out direction is in parallel with the transport direction. Further, the feed-out evacuation section 732 and that 735 each representing a feed-out end of a feed-out means are located on the same circumference of a circle whose center is a rotation axis for rotation of transport stand 6 which is a transport stand, and its feed-out direction points to the center of rotation of the transport stand. The feed-out direction of each of the feed-out evacuation sections 734–736 each representing a feed-out end of a feed-out means is in parallel with the front-rear direction (second direction) that is perpendicular to the transport direction, and its feed-out end is positioned on the same plane perpendicular to the front-rear direction (second direction).

Figure 20:
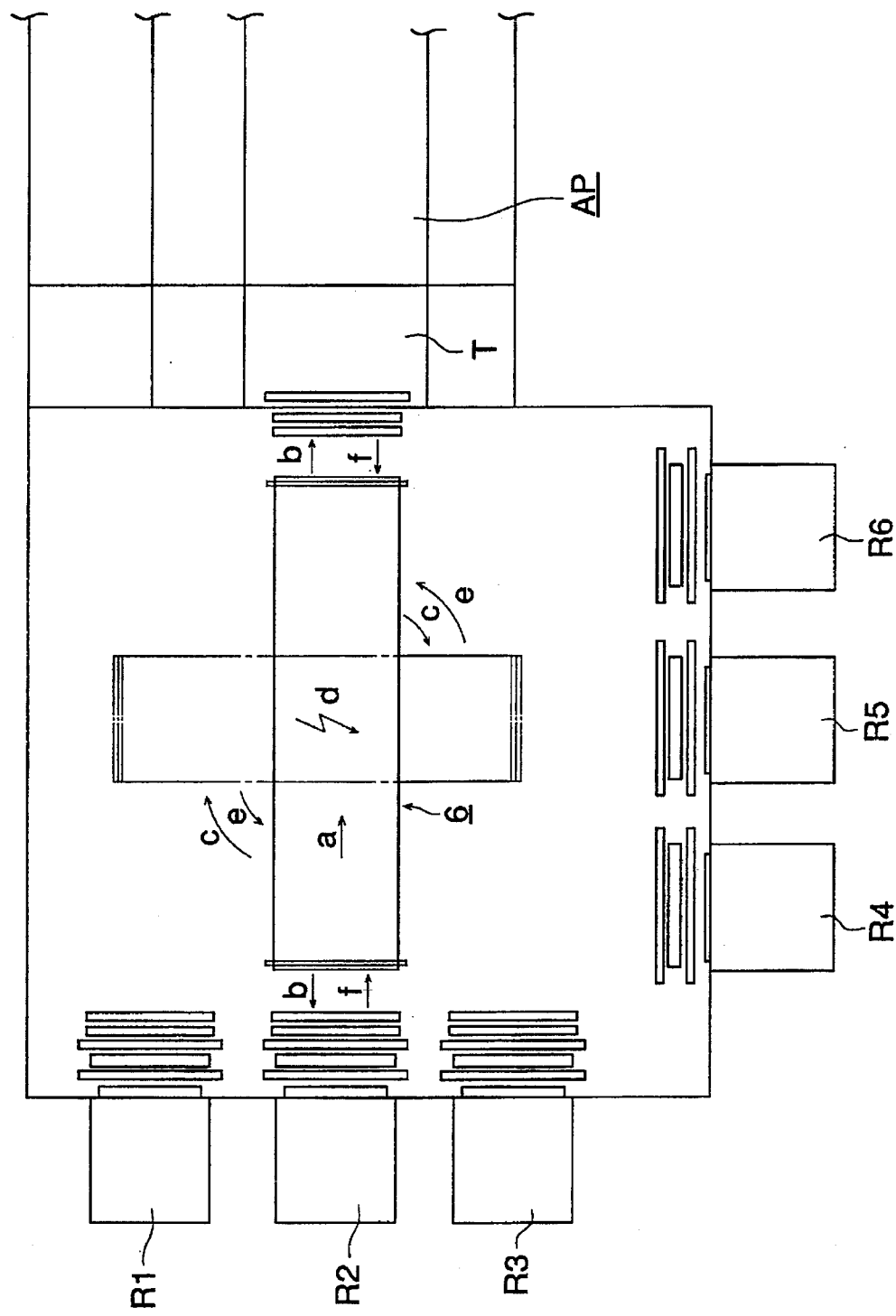
FIG. 20 is an illustration for operations of the photographic printing apparatus in Example 5.

Next, operations in the present example will be explained as follows, referring to FIGS. 19 and 20. The control means in photographic printing apparatus main body B controls the operations as follows.

When transport stand 6 receives a photographic paper from feed-out evacuation section 732 representing an feed-out end transfers it to an exposure position and to a downstream transport section, operations are as follows. In procedures for printing in the ordinary direction of a photographic paper, exposure stand 6 receives a sheet-shaped photographic paper from feed-out means 7, then the sheet-shaped photographic paper is positioned at the center of the exposure stand 6, exposure is conducted, and the sheet-shaped photographic paper is transferred to downstream transport section T.

When exposing a photographic paper in the direction perpendicular to the ordinary direction, procedures are as follows.
a. Exposure stand 6 receives a sheet-shaped photographic paper from feed-out means 7.
b. Feed-out evacuation section 732 of the feed-out means 7 and downstream transport evacuation section T1 of downstream transport section T are evacuated.
c. The exposure stand 6 is rotated to be positioned.
d. Exposure is conducted.
e. The exposure stand 6 is rotated to be returned to the original direction.
f. Feed-out evacuation section 732 of the feed-out means 7 and downstream transport evacuation section T1 of downstream transport section T are caused to be in the state wherein they are not evacuated.
g. The sheet-shaped photographic paper is transferred from the exposure stand 6 to the downstream transport section T.

A photographic light-sensitive material for printing in the first roll magazine and that in the second roll magazine can be drawn out by a common feed-out means without a problem that the first roll magazine hits the second roll magazine. Therefore, it is possible to supply photographic light-sensitive materials for printing from a plurality of roll magazines with less number of constituent members in the feed-out means.

It is possible to switch roll magazines automatically.

It is not necessary to control the first roll magazine transport means and the second roll magazine transport means respectively, and only control for sliding of a roll magazine transport stand is enough.

Even when roll axes of roll magazines are not in parallel with each other, and even when centers of roll axes in the lateral direction are not positioned on the same plane perpendicular to the roll axes, deformation of an accepting means makes it possible to transfer both a sheet-shaped photographic light-sensitive material for printing fed out by the first feed-out means and that fed out by the second feed-out means to the downstream transport section side. Therefore, restriction for arrangement of roll magazines can be eliminated, and thereby it is possible to provide a photographic printing apparatus which is easy to operate or compact wherein a plurality of roll magazines can be set.

Roll magazines can be switched without causing any problem that a rolled photographic light-sensitive material for printing is loosened, or a photographic light-sensitive material for printing drawn out of a roll magazine is fogged.

Roll magazines can be switched quickly, even when a photographic light-sensitive material for printing still exists in a photographic printing apparatus main body, without causing any problem that the photographic light-sensitive material for printing being present in the photographic printing apparatus main body is fogged.

Even when a photographic original is not positioned in its longitudinal direction or lateral direction without coming into contact with or hitting a downstream transport section, or even when different roll magazines are not set for exposing photographic light-sensitive materials for printing in the same size positioned longitudinally and laterally, it is possible to expose the photographic light-sensitive materials for printing, directing them in the longitudinal direction and lateral direction respectively.

When exposing a photographic light-sensitive material for printing in the ordinary direction, a transport stand is neither extended, contracted nor rotated. Therefore, total printing jobs of the aforesaid photographic printing apparatus can be performed efficiently.

Even when a photographic original is not positioned in its longitudinal direction or lateral direction without coming into contact with or hitting a feed-out means, or even when different roll magazines are not set for exposing photographic light-sensitive materials for printing in the same size positioned longitudinally and laterally, it is possible to expose the photographic light-sensitive materials for printing, directing them in the longitudinal direction and lateral direction respectively.

When exposing a photographic light-sensitive material for printing in the ordinary direction, a transport stand is neither extended, contracted nor rotated. Therefore, total printing jobs of the aforesaid photographic printing apparatus can be performed efficiently.

Even when a photographic original is not positioned in its longitudinal direction or lateral direction without coming into contact with or hitting a feed-out means and a downstream transport section, or even when different roll magazines are not set for exposing photographic light-sensitive materials for printing in the same size positioned longitudinally and laterally, it is possible to expose the photographic light-sensitive materials for printing, directing them in the longitudinal direction and lateral direction respectively.

When exposing a photographic light-sensitive material for printing in the ordinary direction, a transport stand is not rotated but is just moved. Therefore, total printing jobs of the aforesaid photographic printing apparatus can be performed efficiently.

Even when a photographic original is not positioned in its longitudinal direction or lateral direction without coming into contact with or hitting a feed-out means, or even when different roll magazines are not set for exposing photographic light-sensitive materials for printing in the same size positioned longitudinally and laterally, it is possible to expose the photographic light-sensitive materials for printing, directing them in the longitudinal direction and lateral direction respectively.

When exposing a photographic light-sensitive material for printing in the ordinary direction, the aforesaid feed-out means is not evacuated and the transport stand is not rotated. Therefore, total printing jobs of the aforesaid photographic printing apparatus can be performed efficiently.

Even when a photographic original is not positioned in its longitudinal direction or lateral direction without coming into contact with or hitting a downstream transport section, or even when different roll magazines are not set for exposing photographic light-sensitive materials for printing in the same size positioned longitudinally and laterally, it is possible to expose the photographic light-sensitive materials for printing, directing them in the longitudinal direction and lateral direction respectively.

When exposing a photographic light-sensitive material for printing in the ordinary direction, the aforesaid feed-out means is not evacuated and the transport stand is not rotated. Therefore, total printing jobs of the aforesaid photographic printing apparatus can be performed efficiently.

A photographic light-sensitive material for printing in the first roll magazine and that in the second roll magazine can be drawn out by a common feed-out means without a problem that the first roll magazine hits the second roll magazine. Therefore, it is possible to supply photographic light-sensitive materials for printing from a plurality of roll magazines with less number of constituent members in the feed-out means.

It is possible to automatically switch a plurality of roll magazines from which photographic light-sensitive materials for printing can be supplied.

It is not necessary to control the first roll magazine transport means and the second roll magazine transport means respectively, and only control for sliding of a roll magazine transport stand is enough.

What is claimed is:

1. A photographic printing apparatus comprising:
a first roll magazine for storing roll-shaped photographic light-sensitive material therein, the first roll magazine being movable between a draw-out position and a first standby position away from the draw-out position, the material being drawn out from the first roll magazine and fed into a main body of the apparatus when the first roll magazine is in the draw-out position;
first detecting means for detecting when the first roll magazine is at the first standby position;
a second roll magazine for storing roll-shaped photographic light-sensitive material therein, the second roll magazine being movable between the draw-out position and a second stand by position away from the draw-out position, the material being drawn out from the second roll magazine and fed into the main body of the apparatus when the second roll magazine is in the draw-out position;
second detecting means for detecting when the second roll magazine is at the second standby position;
first transport means for transporting the first roll magazine between the first standby position and the draw-out position, the first transport means transporting the first roll magazine to the draw-out position when the second detecting means detects the second roll magazine at the second standby position;
second transport means for transporting the second roll magazine between the second standby position and the draw-out position, the second transport means transporting the second roll magazine to the draw-out position when the first detecting means detects the first roll magazine at the first standby position; and
feeding means for drawing the material out from either the first or the second roll magazine when the first or the second roll magazine is positioned at the draw-out position, the feeding means feeding the material back to the first roll magazine before the first transport means transports the first roll magazine from the draw-out position to the first standby position and feeding the material back to the second roll magazine before the second transport means transports the second roll magazine from the draw-out position to the second standby position, the feeding means including
a pair of elastic rollers in pressure contact with one another so that the pair of elastic rollers shield an inside of the main body from light.

2. A photographic printing apparatus comprising:
a first roll magazine for storing roll-shaped photographic light-sensitive material therein;
a second roll magazine for storing roll-shaped photographic light-sensitive material therein;
first draw-out means for drawing the material out from the first roll magazine at a first draw-out position;
second draw-out means for drawing the material out from the second roll magazine at a second draw-out position;
accepting means for holding at an exposure position the material drawn out from either the first roll magazine or the second roll magazine, the accepting means including
conveying means for conveying the material from the first draw-out position to the exposure position or from the second draw-out position to the exposure position, the accepting means having a length extending in a conveying direction of the conveying means;
means for increasing or decreasing the length of the accepting means; and
drive means for driving the accepting means from the first draw-out position to the second draw-out position.

3. A photographic printing apparatus comprising:
a first roll magazine for storing roll-shaped photographic light-sensitive material therein;
a second roll magazine for storing roll-shaped photographic light-sensitive material therein;
first draw-out means for drawing the material out from the first roll magazine at a first draw-out position;
second draw-out means for drawing the material out from the second roll magazine at a second draw-out position;

exposure means for exposing the material at an exposure position;

accepting means for holding at the exposure position the material drawn out from either the first roll magazine or the second roll magazine, the accepting means including conveying means for conveying the material from the first draw-out position to the exposure position or from the second draw-out position to the exposure position; and drive means for driving the accepting means from the first draw-out position to the second draw-out position, the drive means rotating the accepting means about an axis parallel to an optical axis of the exposure means and moving the accepting means in a direction parallel to a conveying direction of the conveying means or in a direction perpendicular to the conveying direction.

4. The apparatus of claim 3, wherein the accepting means comprises:

a transport belt for transporting the material thereon;

a transport stand;

a suction table disposed on the transport stand below the transport belt, the suction table having a plurality of suction ports through which suction is applied to draw the material in close contact with the transport belt; and at least one cover for opening or closing some of the suction ports according to a size of the material to be conveyed so that suction pressure is varied.

5. The apparatus of claim 4, further comprising means for moving the cover to open and close some of the suction ports on the basis of a predetermined opening and closing method.

6. The apparatus of claim 5, wherein the suction ports are arranged in rows along a conveyance direction of the suction table and the apparatus includes two covers, the moving means moving the two covers to open or close suction ports in at least one pair of the rows arranged symmetrically with respect to a conveyance axis of the suction table.

7. The apparatus of claim 5, wherein the suction ports are arranged in rows and the apparatus includes two covers, the moving means moving the two covers to open or close suction ports located in rows adjacent to opposite ends of the suction table such that suction ports in a middle of the suction table remain open.

8. The apparatus of claim 3, wherein the conveying means conveys the material while the drive means rotates or moves the accepting means.

* * * * *